(12) United States Patent
Tanizawa et al.

(10) Patent No.: US 11,894,875 B2
(45) Date of Patent: Feb. 6, 2024

(54) SIGNAL PROCESSING SYSTEM

(71) Applicant: TAMAGAWA UNIVERSITY AND TAMAGAWA ACADEMY, Tokyo (JP)

(72) Inventors: Ken Tanizawa, Tokyo (JP); Fumio Futami, Tokyo (JP)

(73) Assignee: TAMAGAWA UNIVERSITY AND TAMAGAWA ACADEMY, Tokyo (JP)

( * ) Notice: Subject to any disclaimer, the term of this patent is extended or adjusted under 35 U.S.C. 154(b) by 181 days.

(21) Appl. No.: 17/600,476

(22) PCT Filed: Feb. 28, 2020

(86) PCT No.: PCT/JP2020/008530
§ 371 (c)(1),
(2) Date: Sep. 30, 2021

(87) PCT Pub. No.: WO2020/202964
PCT Pub. Date: Oct. 8, 2020

(65) Prior Publication Data
US 2022/0173809 A1  Jun. 2, 2022

(30) Foreign Application Priority Data
Apr. 4, 2019  (JP) .................................. 2019-071981

(51) Int. Cl.
*H04B 10/2575* (2013.01)
(52) U.S. Cl.
CPC ................................. *H04B 10/2575* (2013.01)
(58) Field of Classification Search
CPC .................................................. H04B 10/2575
(Continued)

(56) References Cited

U.S. PATENT DOCUMENTS 7,627,126 B1 * 12/2009 Pikalo ................... H04L 9/0858
713/168
8,116,638 B2 * 2/2012 Fitzgerald ........ H04B 10/25752
398/198
(Continued)

FOREIGN PATENT DOCUMENTS

JP 2006-080720 A 3/2006
JP 2007-079096 A 3/2007
(Continued)

OTHER PUBLICATIONS

International Search Report issued in PCT/JP2020/008530; dated Jun. 9, 2020.
(Continued)

*Primary Examiner* — Dalzid E Singh
(74) *Attorney, Agent, or Firm* — Studebaker & Brackett PC

(57) ABSTRACT

The present invention addresses the problem of providing a signal process in which a countermeasure against eavesdropping over a physical layer in a wireless communication is performed. An optical signal generation unit 11 generates, as an optical signal, multivalued information that is in a multivalued state and is based on prescribed data. An E/O conversion unit 112 converts the optical signal to an electrical signal. An optical signal amplification unit 12 amplifies the optical signal. An O/E conversion unit 13 converts the optical signal to an electrical signal. A radio wave transmission unit 14 transmits, as a radio wave, the multivalued information converted into the electrical signal. The problem is solved thereby.

17 Claims, 8 Drawing Sheets

(58) Field of Classification Search
USPC .......................................................... 398/115
See application file for complete search history.

(56) References Cited

U.S. PATENT DOCUMENTS

| | | | | |
|---|---|---|---|---|
| 10,027,415 B2* | 7/2018 | Cho | ................. | H04B 10/25759 |
| 10,090,928 B2* | 10/2018 | Sung | ................ | H04B 10/25133 |
| 2006/0222180 A1* | 10/2006 | Elliott | .................. | H04L 9/0852 |
| | | | | 380/278 |
| 2006/0263096 A1* | 11/2006 | Dinu | .................... | H04L 9/0858 |
| | | | | 398/187 |
| 2007/0172058 A1* | 7/2007 | Sada | ................. | H04N 21/2347 |
| | | | | 380/212 |
| 2007/0234051 A1* | 10/2007 | Akutsu | ................ | H04L 9/0852 |
| | | | | 713/168 |
| 2010/0008497 A1* | 1/2010 | Takatsu | ................... | H04L 9/002 |
| | | | | 380/42 |
| 2012/0328100 A1 | 12/2012 | Hirota | | |
| 2015/0222359 A1* | 8/2015 | Kai | ........................ | H04L 27/36 |
| | | | | 398/115 |

FOREIGN PATENT DOCUMENTS

| | | |
|---|---|---|
| JP | 2010-114662 A | 5/2010 |
| JP | 2012-085028 A | 4/2012 |

OTHER PUBLICATIONS

Tanizawa, Ken et al., Photonic Generation of Quantum Noise Assisted Cipher at Microwave Frequencies for Secure Wireless Links, 2020 Optical Fiber Communications Conference and Exhibition (OFC) [online], https://ieeexplore.ieee.org/stamp/stamp.jsp?tp=&arnumber=9083118.

* cited by examiner

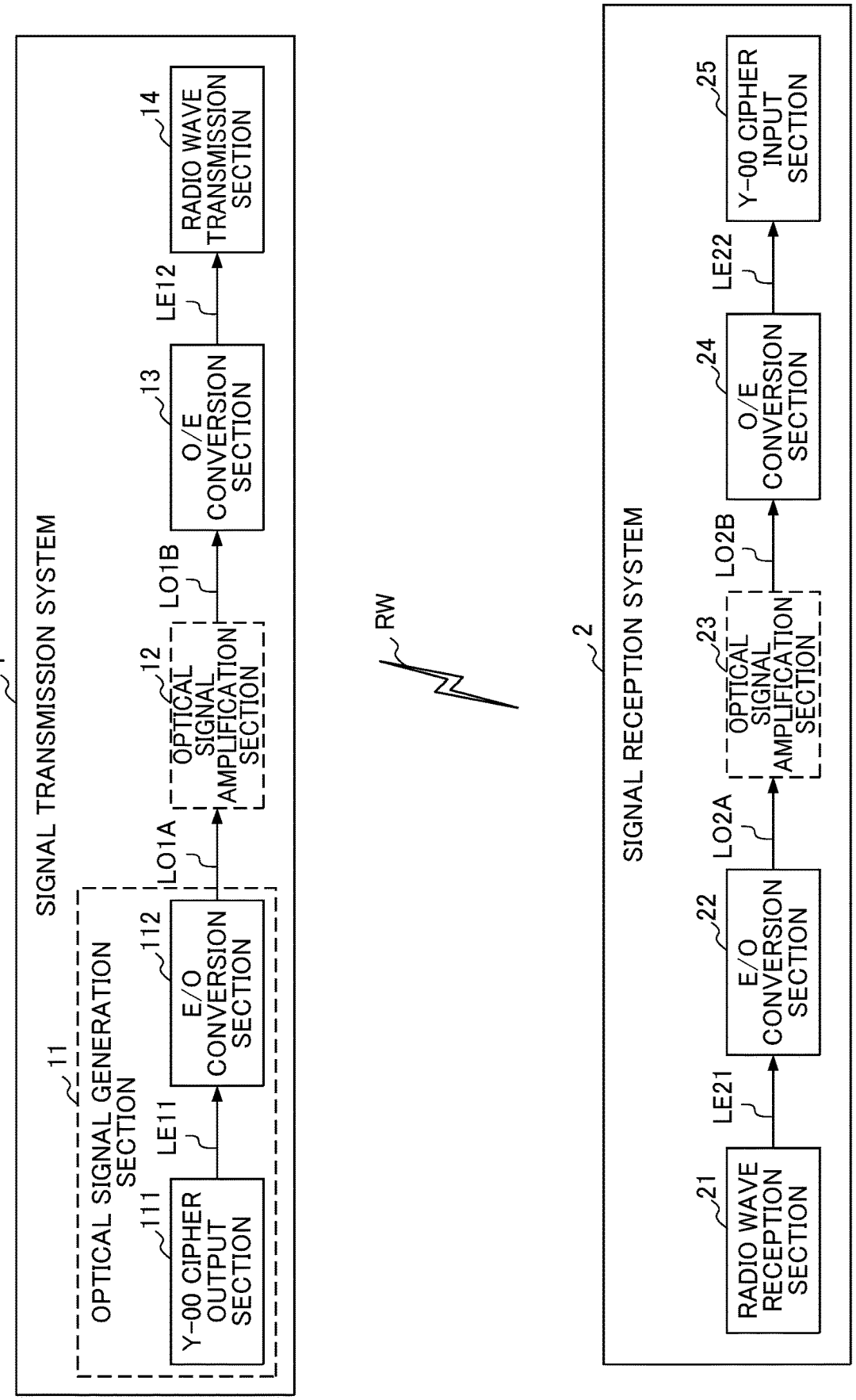

SIGNAL PROCESSING SYSTEM

TECHNICAL FIELD

The present invention relates to a signal processing system.

BACKGROUND ART

In recent years, security in information communication has become more important. A network system forming the Internet is described by an OSI reference model developed by the International Organization for Standardization. In the OSI reference model, classification from a physical layer of a layer 1 to an application layer of a layer 7 is set, and an interface connecting each layer is standardized or normalized by de facto. Of these layers, the lowermost layer is the physical layer undertaking a role for actually transmitting/receiving a signal with or without a wire. Currently, the security (in many cases, by mathematical cryptography) is implemented for a layer 2 or higher, and no security is implemented for the physical layer. However, there is also the risk of eavesdropping in the physical layer. For example, in optical fiber communication as a representative of wired communication, a branch is, in principle, installed on an optical fiber to take out part of signal power so that a mass of information can be stolen at once. For this reason, the present applicant has developed, as an encryption technique in the physical layer, a predetermined protocol described in Patent Document 1, for example.

Patent Document 1: Japanese Unexamined Patent Application, Publication No. 2012-085028

DISCLOSURE OF THE INVENTION

Problems to be Solved by the Invention

However, in the typical technique including Patent Document 1 above, multivalued information is transmitted as an optical signal so that telesecurity in the physical layer in the case of using the optical fiber can be provided, but telesecurity in the physical layer in wireless communication cannot be provided.

An object of the present invention is to provide telesecurity in a physical layer in wireless communication.

Means for Solving the Problems

For achieving the above-described object, a signal processing system of one aspect of the present invention includes
 a light generation unit that generates, as an optical signal, multivalued information in a multivalued state based on predetermined data,
 an optical-electrical conversion unit that converts the optical signal into an electrical signal, and
 a radio wave transmission unit that transmits, as a radio wave, the multivalued information converted into the electrical signal.

Effects of the Invention

According to the present invention, the telesecurity in the physical layer in the wireless communication can be provided.

BRIEF DESCRIPTION OF THE DRAWINGS

FIG. 1 is a block diagram showing one example of the configuration of a signal transmission/reception system including a signal transmission system according to one embodiment of a signal processing system of the present invention;

PREFERRED MODE FOR CARRYING OUT THE INVENTION

Figure 2A:
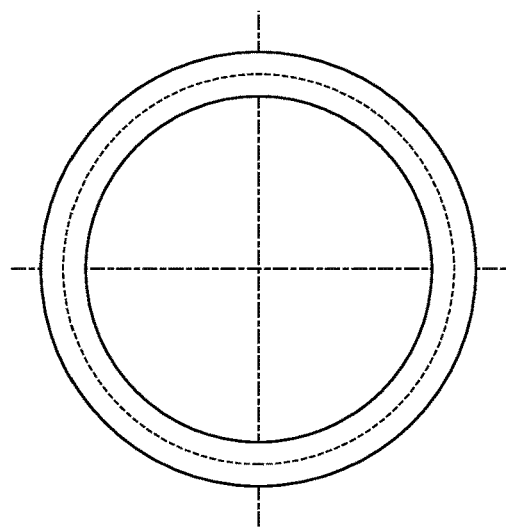
FIG. 2 shows views for describing the outline of the principle of Y-00 optical communication quantum cryptography applied to the signal transmission system of FIG. 1.

Hereinafter, an embodiment of the present invention will be described. FIG. 1 is a block diagram showing one example of the configuration of a signal transmission/reception system according to one embodiment of a signal processing system of the present invention. The signal transmission/reception system of the example of FIG. 1 includes a signal transmission system 1 and a signal reception system 2. The signal transmission system 1 encrypts a signal targeted for transmission based on a Y-00 optical communication quantum cryptography protocol, and transmits the signal in the form of a radio wave RW. The signal reception system 2 receives the radio wave RW to decrypt the radio wave RW based on the Y-00 optical communication quantum cryptography protocol and receive the signal in the above-described form. Note that although details will be described later, Y-00 optical communication quantum cryptography is an encryption method based on a principle that multivalued information converted from predetermined data as a transmission target based on the Y-00 optical communication quantum cryptography protocol is transmitted as an optical signal and the received signal is an encrypted encryption signal accordingly.

First, the configuration of the signal transmission system 1 that transmits the radio wave RW encrypted based on the Y-00 optical communication quantum cryptography protocol will be described. The signal transmission system 1 includes an optical signal generation section 11, an optical signal amplification section 12, an O/E conversion section 13, and a radio wave transmission section 14.

The optical signal generation section 11 generates, as the optical signal, the multivalued information in a multivalued state based on the predetermined data. Although details will be described later, the optical signal is the signal targeted for transmission. The optical signal generation section 11 includes a Y-00 cipher output section 111 and an E/O conversion section 112.

The Y-00 cipher output section 111 generates an electrical signal (hereinafter referred to as a "first electrical signal" for clearly distinguishing the first electrical signal from later-described second to fourth electrical signals) of the multivalued information in the multivalued state based on the predetermined data. That is, the Y-00 cipher output section 111 generates the predetermined data as the transmission target, or acquires the predetermined data from a not-shown generation source. The Y-00 cipher output section 111 outputs the multivalued information, which is generated based on the Y-00 optical communication quantum cryptography protocol by means of the predetermined data, as the multivalued information in the form of the first electrical signal via a signal line LE11. Note that the first electrical signal on the signal line LE11 may be any of an analog signal and a digital signal, but will be described as the analog signal in the present embodiment. Note that in a case where the first electrical signal is the digital signal, the signal line LE11 includes, as necessary, a configuration (e.g., a configuration including a plurality of signal lines for transmitting signals in parallel or a data processing section that transmits a signal in series) capable of transmitting a plurality of bits.

The E/O conversion section 112 converts the first electrical signal of the multivalued information output from the Y-00 cipher output section 111 into the optical signal. That is, the E/O conversion section 112 converts the first electrical signal of the multivalued information input via LE11 into the optical signal modulated by an optional modulation method, and outputs the optical signal via a signal line LO1A.

Note that the signal line LO1A may include an optical signal line of an optical communication cable. The optical communication cable is used as the signal line LO1A as described above so that the E/O conversion section 112 and the later-described O/E conversion section 13 can be placed with a distance from each other in the signal transmission system 1.

The optical signal amplification section 12 amplifies the optical signal generated from the E/O conversion section 112. That is, the optical signal amplification section 12 amplifies and outputs the optical signal generated from the E/O conversion section and transmitted via the signal line LO1A. The optical signal (the amplified optical signal) output from the optical signal amplification section 12 is transmitted to the O/E conversion section 13 via a signal line LO1B.

Note that the signal line LO1B may include an optical signal line of an optical communication cable as in the signal line LO1A. That is, the optical signal amplification section 12 can be used as a repeater on the optical signal line, the repeater being capable of amplifying the optical signal attenuated when passing through the signal line LO1A. The optical signal amplification section 12 as the repeater is employed as described above so that an optical signal line distance between the E/O conversion section 112 and the later-described O/E conversion section 13 can be extended. In other words, the E/O conversion section 112 and the later-described O/E conversion section 13 can be placed with a further distance from each other.

The O/E conversion section 13 converts the optical signal amplified by the optical signal amplification section 12 and transmitted via the signal line LOB into an electrical signal (hereinafter referred to as the "second electrical signal" for clearly distinguishing the second electrical signal from the above-described first electrical signal and the later-described third and fourth electrical signals). That is, the O/E conversion section 13 coverts the optical signal corresponding to the multivalued information generated based on the Y-00 optical communication quantum cryptography protocol and transmitted via the signal line LO1 into the second electrical signal, and outputs the second electrical signal. The second electrical signal output from the O/E conversion section 13 is transmitted to the radio wave transmission section 14 via a signal line LE12. As a result of conversion from the optical signal by the O/E conversion section 13, the second electrical signal turns into an electrical signal containing shot noise. That is, the second electrical signal turns into the signal (hereinafter referred to as the "encryption signal") encrypted according to the principle of the later-described Y-00 optical communication quantum cryptography. The data cannot be accurately reconstructed from the encryption signal as long as the encryption signal is not decrypted according to the Y-00 optical communication quantum cryptography protocol. That is, even when a third party intercepts the second signal, it is difficult for the third party to decrypt the second electrical signal. Note that in the present specification, the term "encryption signal" indicates an encrypted signal regardless of a form such as an electrical signal, an optical signal, or a radio wave.

Note that in FIG. 1, the optical signal amplification section 12 is indicated by a dashed line. This means that the optical signal amplification section 12 is not an essential component for the signal transmission system 1 and the number of optical signal amplification sections 12 is not limited to one and may be an optional number even if the optical signal amplification section 12 is included as a component. That is, in a case where an optical transmission path distance between the E/O conversion section 112 and the O/E conversion section 13 is long, a plurality of optical signal amplification sections 12 as repeaters on an optical transmission path can be installed, for example. On the other hand, in a case where the optical transmission path distance between the E/O conversion section 112 and the O/E conversion section 13 is short and it is not necessary to amplify the optical signal generated from the E/O conversion section 112, the signal transmission system 1 can be configured with no optical signal amplification section 12, for example. Unless otherwise stated hereinafter, it is assumed that the signal transmission system 1 does not include the optical signal amplification section 12 and the E/O conversion section 112 and the O/E conversion section 13 are connected to each other via the signal line LO1A and the signal line LO1B (hereinafter, collectively referred to as a "signal line LO1") directly connected to each other.

The radio wave transmission section 14 transmits, in the form of the radio wave RW, the encryption signal converted into the second electrical signal by the O/E conversion section 13 and transmitted via the signal line LE12. That is, the radio wave transmission section 14 performs control such as predetermined amplification or frequency conversion for the second electrical signal as the encryption signal, and thereafter, transmits the second electrical signal as the radio wave RW via a component such as an antenna. That is, the second electrical signal transmitted in the form of the radio wave RW is the encryption signal.

A case where the third party intercepts the radio wave RW and converts the radio wave RW into an electrical signal will be assumed herein. In this case, the electrical signal of the radio wave RW acquired by the third party is the encryption signal obtained by conversion of the multivalued information generated based on the Y-00 optical communication quantum cryptography protocol into the optical signal and further conversion of the optical signal into the second electrical signal. That is, it is difficult for the third party to decrypt the acquired electrical signal as the radio wave RW.

The configuration example of the signal transmission system 1 that transmits the encryption signal, which is encrypted based on the Y-00 optical communication quantum cryptography protocol, in the form of the radio wave RW has been described above. Next, a configuration example of the signal reception system 2 that receives the radio wave RW to decrypt the radio wave RW based on the Y-00 optical communication quantum cryptography protocol will be described.

The signal reception system 2 includes a radio wave reception section 21, an E/O conversion section 22, an optical signal amplification section 23, an O/E conversion section 24, and a Y-00 cipher input section 25.

The radio wave reception section 21 receives the radio wave RW transmitted from the signal transmission system 1. That is, the radio wave reception section 21 receives the encryption signal in the form of the radio wave RW via, e.g., an antenna, and outputs the encryption signal in the form of an electrical signal (hereinafter referred to as the "third electrical signal" for clearly distinguishing the third electrical signal from the above-described first and second electrical signals and the later-described fourth electrical signal). The third electrical signal output from the radio wave reception section 21 is transmitted to the E/O conversion section 22 via a signal line LE21.

The E/O conversion section 22 converts the third electrical signal corresponding to the radio wave RW received by the radio wave reception section 21 into the optical signal. That is, the E/O conversion section 22 converts the encryption signal in the form of the third electrical signal received by the radio wave reception section 21 and transmitted via the signal line LE21 into the form of the optical signal, and outputs the optical signal. The third electrical signal output from the E/O conversion section 22 is transmitted to the optical signal amplification section 23 via a signal line LO2A.

Note that the signal line LO2A may include an optical signal line of an optical communication cable. The optical communication cable is used as the signal line LO2A as described above so that the E/O conversion section 22 and the later-described O/E conversion section 24 can be placed with a distance from each other in the signal reception system 2.

The optical signal amplification section 23 amplifies the optical signal converted by the E/O conversion section 22. That is, the optical signal amplification section 23 amplifies and outputs the optical signal converted by the E/O conversion section and transmitted via the signal line LO2A. The optical signal (the amplified optical signal) output from the optical signal amplification section 23 is transmitted to the O/E conversion section 24 via a signal line LO2B.

Note that the signal line LO2B may include an optical signal line of an optical communication cable as in the signal line LO2A. That is, the optical signal amplification section 23 can be used as a repeater on the optical signal line, the repeater being capable of amplifying the optical signal attenuated when passing through the signal line LO2A. The optical signal amplification section 23 as the repeater is employed as described above so that an optical signal line distance between the E/O conversion section 22 and the later-described O/E conversion section 24 can be extended. In other words, the E/O conversion section 22 and the later-described O/E conversion section 24 can be placed with a further distance from each other.

Note that in FIG. 1, the optical signal amplification section 23 is indicated by a dashed line. This means that the optical signal amplification section 23 is not an essential component for the signal reception system 2 and the number of optical signal amplification sections 23 is not limited to one and may be an optional number even if the optical signal amplification section 23 is included as a component. That is, in a case where an optical transmission path distance between the E/O conversion section 22 and the O/E conversion section 24 is long, a plurality of optical signal amplification sections 23 as repeaters on an optical transmission path can be installed, for example. On the other hand, in a case where the optical transmission path distance between the E/O conversion section 22 and the O/E conversion section 24 is short and it is not necessary to amplify the optical signal generated from the E/O conversion section 22, the signal reception system 2 can be configured with no optical signal amplification section 23, for example. Unless otherwise stated hereinafter, it is assumed that the signal reception system 2 does not include the optical signal amplification section 23 and the E/O conversion section 22 and the O/E conversion section 24 are connected to each other via the signal line LO2A and the signal line LO2B (hereinafter, collectively referred to as a "signal line LO2") directly connected to each other.

The O/E conversion section 24 converts the optical signal amplified by the optical signal amplification section 12 and transmitted via the signal line LO2 into an electrical signal (hereinafter referred to as the "fourth electrical signal" for clearly distinguishing the fourth electrical signal from the above-described first to third electrical signals). That is, the O/E conversion section 24 converts the optical signal corresponding to the encryption signal as the radio wave RW and transmitted via the optical transmission path including the signal line LO2 into the fourth electrical signal, and outputs the fourth electrical signal. The fourth electrical signal output from the O/E conversion section 24 is transmitted to the Y-00 cipher input section 25 via a signal line LE22.

The encryption signal in the form of the fourth electrical signal converted by the O/E conversion section 24 is input to the Y-00 cipher input section 25 via the signal line LE22, and the Y-00 cipher input section 25 decrypts the encryption signal based on the Y-00 optical communication quantum cryptography protocol to convert the encryption signal into the predetermined data targeted for transmission. Moreover, the Y-00 cipher input section 25 acquires the decrypted predetermined data, or provides the predetermined data to a not-shown reception destination.

Further, in a case where the radio wave reception section 21 and the Y-00 cipher input section 25 are placed close to each other, the radio wave reception section 21 and the Y-00 cipher input section 25 may be connected to each other via the signal line LE21 and the signal line LE22 directly connected to each other. That is, the third electrical signal can be employed as the fourth electrical signal, and can be directly input to the Y-00 cipher input section 25.

The configuration example of the signal reception system 2 that receives the radio wave RW to decrypt the radio wave RW based on the Y-00 optical communication quantum cryptography protocol has been described above.

As described above, in the signal transmission/reception system of the present embodiment, the E/O conversion section 112 and the O/E conversion section 13 are employed as those transmitting the optical signal via the signal line LO1. Thus, in the example of FIG. 1, optical fiber communication as a representative of wired communication is employed as an optical signal communication method. In the optical fiber communication, the third party can install, in principle, a branch on an optical fiber to take out part of signal power, thereby stealing a mass of information (the encrypted signal in this case, and hereinafter referred to as the "encryption signal") at once.

For this reason, the technique of preventing the third party from recognizing the meaning and contents of the encryption signal, i.e., the contents of a plaintext (transmission data), even if the encryption signal has been stolen is necessary. The present applicant has, as such a technique, developed the technique using the Y-00 optical communication quantum cryptography. Although details will be described later, the Y-00 optical communication quantum cryptography is quantum cryptography according to the particle theory of light, and can be applied to the optical fiber communication. On the other hand, such a technique cannot be applied to communication with extremely-lower quantum properties than those of light, such as wireless communication using the radio wave RW.

In the signal transmission/reception system of the present embodiment as described herein, the signal transmission system 1 and the signal reception system 2 exchange information (the encryption signal) via the wireless communication as described above. Thus, in the example of FIG. 1, the encryption signal is, in the form of the radio wave RW for the wireless communication, exchanged between the signal transmission system 1 and the signal reception system 2. In the wireless communication, there is a problem that the third party can intercept, in principle, the radio wave RW to steal a mass of information (the encryption signal in this case) at once. For this reason, the signal transmission/reception system of the present embodiment is configured so that such a problem can be solved. Hereinafter, the technique of solving this problem will be described.

The Y-00 optical communication quantum cryptography is characterized in that "a ciphertext cannot be accurately acquired due to the effect of quantum noise", and has been developed by the present applicant. In the Y-00 optical communication quantum cryptography, the data (the plaintext) targeted for transmission is represented by one or more groups of bit data of "0" or "1". Each piece of bit data forming such transmission data is modulated to a predetermined value of M (M is an integer of two or greater) values according to a predetermined algorithm. Thus, such a numerical value M will be hereinafter referred to as a "modulation number M".

In the Y-00 optical communication quantum cryptography, the transmission data (the plaintext) is encrypted in such a manner that at least one of the phase or amplitude of the optical signal (a carrier wave) is, for each bit, modulated to any of the values corresponding to the modulation number M on an encryption side and a decryption side according to a cipher key. The modulation number M is set to an enormous number of values, and in this manner, the characteristic "a ciphertext cannot be accurately acquired due to the effect of quantum noise" is achieved. For the "predetermined protocol" employed for the Y-00 optical communication quantum cryptography, see Japanese Unexamined Patent Application, Publication No. 2012-085028, for example. The summary of the principle of the Y-00 optical communication quantum cryptography will be briefly described with reference to FIGS. 2 and 3, taking phase modulation as an example.

Figure 2B:
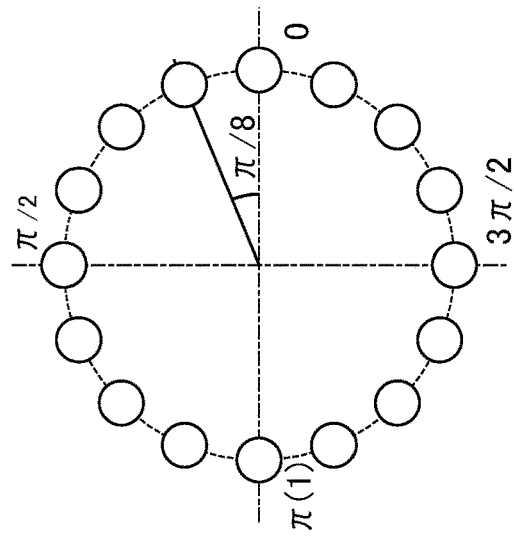
Figure 2C:
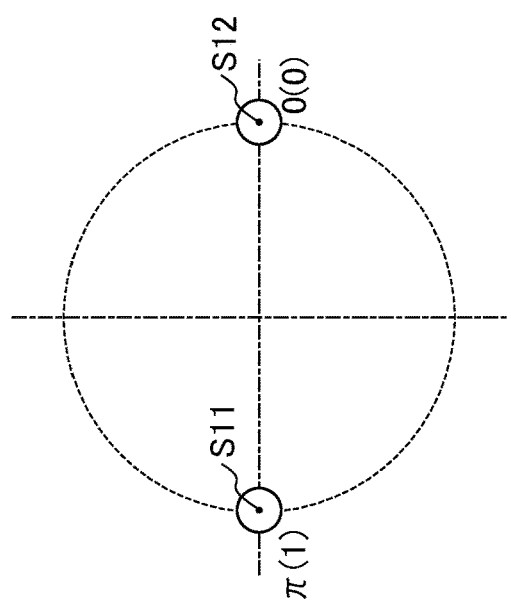

FIG. 2 shows views for describing the summary of the principle of the Y-00 optical communication quantum cryptography. FIGS. 2(a) to 2(c) show an IQ plane showing the phase and amplitude (intensity) of the optical signal with respect to an origin as an intersection between the vertical axis and the horizontal axis. When a single point on the IQ plane is determined, the phase and amplitude of the optical signal are uniquely determined. The phase is an angle between a line segment from the origin of the IQ plane as a starting point to the point indicating the optical signal as an end point and a line segment indicating a phase 0. On the other hand, the amplitude is a distance between the point indicating the optical signal and the origin of the IQ plane.

FIG. 2(a) is the view for describing the principle of normal binary modulation for the sake of easy understanding of the Y-00 optical communication quantum cryptography. For example, in a case where the plaintext (the transmission data) is transmitted with the plaintext being directly superimposed on the optical signal (the carrier wave), the binary modulation shown in FIG. 2(a) is performed for each piece of bit data (1 or 0) forming the plaintext. In the case of FIG. 2, when the bit data is "0", arrangement of a point (hereinafter referred to as a "symbol point") indicating the optical signal after phase modulation is arrangement of a symbol point S11 indicated by 0(0) on the right side on the horizontal axis, i.e., arrangement that the phase is zero. On the other hand, when the bit data is 1, arrangement of the symbol point after phase modulation is arrangement of a symbol point S12 indicated by $\pi(1)$ on the left side on the horizontal axis, i.e., arrangement that the phase is $\pi$. Note that a solid circle surrounding the symbol point S11 indicates an example of the area of quantum noise fluctuation in a case where the optical signal indicated by the symbol point S11 has been received. Similarly, for the symbol point S12, an example of the area of quantum noise fluctuation is indicated by a solid circle surrounding the symbol point S12.

FIG. 2(b) is the view for describing the principle of phase modulation for Modulation Number M=16 in a case where the Y-00 optical communication quantum cryptography is employed. In the case of the example of FIG. 2(b), any of eight values is, for each piece of bit data forming the plaintext, randomly generated using the cipher key. The phase of the symbol point (the point with the phase 0 corresponding to 0 or the point with the phase $\pi$ corresponding to 1) in the normal binary modulation shown in FIG. 2(a) is rotated for every bit on the IQ plane according to the randomly-generated value of the eight values, and in this manner, the phase modulation is performed. Since the available values for the bit data is two values of "0" and "1", arrangement of the symbol points is arrangement of 16 points (Modulation Number M=16) with phases different from each other by ($\pi/8$) as a result of the phase modulation of the example of FIG. 2(b).

Note that in the case of the example of FIG. 2(b), an available bit data value of "0" or "1" is merely modulated to any of the values corresponding to Modulation Number M=16. Thus, there is a probability that when the optical signal (the encryption signal) with arrangement of 16 symbol points is stolen, the meaning and contents thereof, i.e., the contents of the plaintext (the transmission data), are recognized by the third party. That is, only Modulation Number M=16 does not sufficiently provide the safety of the Y-00 optical communication quantum cryptography. For this reason, an enormous number of values, such as 4096, is actually employed as the modulation number M as shown in FIG. 2(c), and the safety of the Y-00 optical communication quantum cryptography is enhanced.

Figure 3:
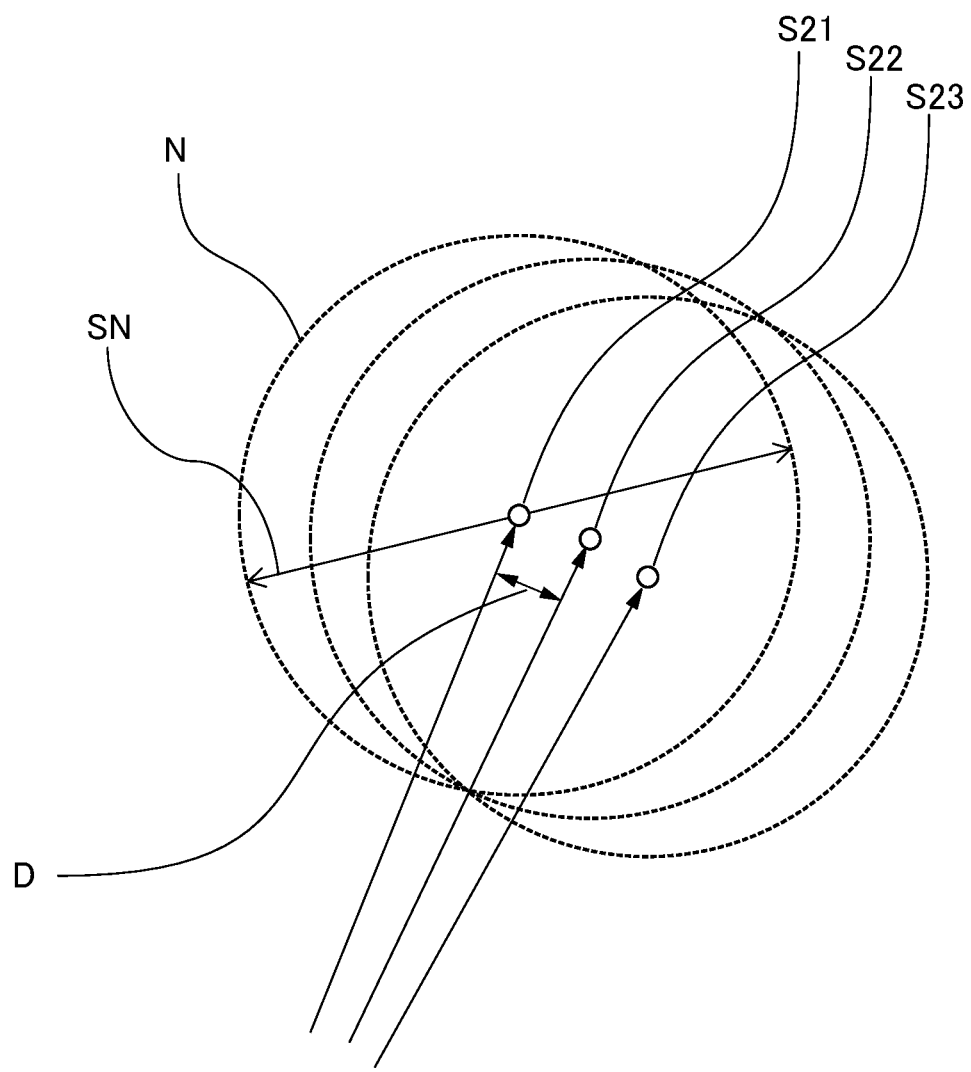
FIG. 3 is an enlarged view of FIG. 2 so that arrangement of adjacent three symbol points of N symbol points, i.e., 4096 symbol points, in phase modulation of FIG. 2 can be viewed.

FIG. 2(c) is the view for describing the principle of phase modulation for Modulation Number M=4096 in a case where the Y-00 optical communication quantum cryptography is employed. FIG. 3 shows an enlarged view of FIG. 2(c) so that arrangement of adjacent three symbol points of N symbol points, i.e., 4096 symbol points, in the phase modulation of FIG. 2(c) can be viewed. As shown in FIG. 3, there is fluctuation due to the shot noise (the quantum noise) only within an area SN about each of symbol points S21 to S23. The shot noise is noise due to the quantum properties of light, and has characteristics that the shot noise is truly random and cannot be removed due to the law of physics. When the phase modulation in which an enormous number of values, such as 4096, is taken as the modulation number M is performed, the adjacent symbol points are hidden and cannot be recognized due to the shot noise as shown in FIG. 3.

Specifically, when a distance D between the adjacent two symbol points S21, S22 is sufficiently shorter than the area SN of the shot noise (when the phase modulation in which an enormous number of values is taken as the modulation number M is performed such that such a decrease is made), it is difficult to determine the position of the original symbol point from the phase information measured on a reception side. That is, it is assumed that the phase measured on the reception side at a certain time point corresponds to the position of the symbol point S22 shown in FIG. 3, for example. In this case, it cannot be distinguished whether the optical signal has been transmitted as one indicated by the symbol point S22, has been actually transmitted as one indicated by the symbol point S21 or the symbol point S23, or has been measured as the symbol point S22 due to the shot noise.

In summary, in the Y-00 optical communication quantum cryptography, the modulation in which an enormous number of values is taken as the modulation number M is employed.

Note that the phase modulation has been described with reference to the examples of FIGS. 2 and 3, but instead of or in addition to such phase modulation, amplitude (intensity) modulation may be employed. That is, for modulation of the optical signal according to the Y-00 protocol, any modulation method such as intensity modulation, amplitude modulation, phase modulation, frequency modulation, and quadrature amplitude modulation can be employed.

As described above, by the Y-00 optical communication quantum cryptography, the distance D between two symbol points can be sufficiently decreased as compared to the area SN of the shot noise in any modulation method, and therefore, the characteristic "a ciphertext cannot be accurately acquired due to the effect of quantum noise" can be exhibited. The quantum noise secures the safety, but actually, accurate acquisition of the ciphertext by an eavesdropper is prevented by the effect of all types of "noise" including classical noise such as thermal noise in addition to the quantum noise.

Hereinafter, reasons why the Y-00 optical communication quantum cryptography can be applied to the optical fiber communication and cannot be applied to the wireless communication will be described. First, a relationship between the indicator of the safety and the frequency of the carrier wave in the Y-00 light quantum cryptography will be described. Hereinafter, a noise masking amount corresponding to "the number of adjacent symbols masked by the shot noise" will be described.

Specifically, in the present specification, the "number of symbol points within a standard deviation range when shot noise distribution is approximated as Gaussian distribution" is defined and described as a noise masking amount $\Gamma$. Note that the concept of the noise masking amount $\Gamma$ is a concept also applicable to distribution other than the shot noise distribution. The method for applying the concept of the noise masking amount $\Gamma$ to other types of noise will be described later.

As described above with reference to FIG. 2, when the distance D between adjacent two symbol points is sufficiently shorter than the area SN of the shot noise, it is difficult to determine the position of the original symbol point from the phase information measured on the reception side. In a case where an optical signal at such an intensity level that high-speed communication can be performed is employed in the optical communication, shot noise amount distribution (the fluctuation area) can be approximated as Gaussian distribution. That is, for the noise masking amount $\Gamma$ of this example, a distance (a radius) corresponding to the area SN of the shot noise described above with reference to FIG. 2 is employed as the standard deviation of the Gaussian distribution of the shot noise.

In other words, the noise masking amount $\Gamma$ is the number of other symbol points within the area SN of the shot noise. That is, the noise masking amount $\Gamma$ indicates the number of other symbol points in a case where the distance D between other symbol point to the certain symbol point is shorter than the area SN of the shot noise. That is, the noise masking amount $\Gamma$ is an amount proportional to the cipher strength of the encryption signal.

For example, in a case where the phase modulation method is employed in the Y-00 light quantum cryptography, the noise masking amount $\Gamma$ is represented by Expression (1) below.

$$\Gamma = \frac{M}{4\pi}\sqrt{\frac{R \cdot h v_0}{P_0}} \tag{1}$$

In this expression, the modulation number M described herein is the number of candidate phases modulated for encryption. A symbol rate R is a number indicating the number of symbol points transmitted per unit time. A Planck's constant h is a physical constant, and is a proportionality constant relating to a photon energy and a frequency. A frequency $v_0$ is a signal frequency. A power $P_0$ is a number indicating a signal power.

In a case where the noise masking amount $\Gamma$ is a sufficiently-great amount, masking by the shot noise works. That is, the Y-00 light quantum cryptography effectively works as a cipher. Specifically, in a case where this value is a sufficiently-great value of 1 or more that the effect of masking by the shot noise is fulfilled, higher safety is achieved, for example. Referring to Expression (1), in a case where the phase modulation method is employed, the noise masking amount $\Gamma$ is proportional to the square root of the signal frequency $v_0$. In other words, in a case where the frequency $v_0$ of the carrier wave is low, the noise masking amount $\Gamma$ is small and the safety in encryption is low.

Specifically, the frequency $v_0$ used for optical fiber transmission is, for example, 200 [THz] (a wavelength is approximately 1.55 [um]). On the other hand, the frequency $v_0$ used for wireless communication with a long-frequency wave is 100 [kHz], for example. The frequency $v_0$ used for wireless communication with a microwave is 10 [GHz], for example.

An example of comparison of the noise masking amount $\Gamma$ under a condition where the parameters other than the frequency ν0 are not changed is as follows. Note that the condition where the parameters other than the frequency ν0 are not changed is a condition where the same symbol rate R and the same power P0 are employed. For example, in the above-described long-frequency wave example, a ratio obtained by division of the noise masking amount Γ in the wireless communication with the long-frequency wave by the noise masking amount Γ in the optical fiber transmission is about 1/45000. For example, in the above-described microwave example, a ratio obtained by division of the noise masking amount Γ in the wireless communication with the microwave by the noise masking amount Γ in the optical fiber transmission is about 1/140.

As described above, as compared to the optical fiber transmission, the noise masking amount Γ is smaller in wireless communication using a radio wave such as a long-frequency wave or a microwave, and for this reason, it has been assumed that it is difficult to use the Y-00 optical communication quantum cryptography. Thus, such cryptography is called the Y-00 "optical" communication quantum cryptography. That is, it has been assumed that visible light and a radio wave are both based on photon movement, but basically, cannot be utilized with a frequency of a visible light range or higher.

The reasons why the Y-00 optical communication quantum cryptography can be applied to the optical fiber communication, but cannot be applied to the wireless communication have been described above. As described above, in the wireless communication, the third party can intercept, in principle, the radio wave RW to steal a mass of information (in this case, the encryption signal) at once. For this reason, there has been a demand for encryption in a physical layer for avoiding accurate data reconstruction even if the third party intercepts the radio wave RW. In response to such a demand, the signal transmission/reception system of the present embodiment is capable of encrypting even the radio wave RW in the physical layer in the wireless communication. That is, the signal transmission system 1 of the above-described present embodiment is a system (a system configured based on mechanism allowing application to the wireless communication) that the Y-00 optical communication quantum cryptography can be applied to the wireless communication.

Hereinafter, in the present embodiment, the mechanism allowing application of the Y-00 optical communication quantum cryptography to the wireless communication will be described. As described above, in the present embodiment, the form of the signal as the predetermined data targeted for transmission is converted through various types of conversion. As a result of these types of conversion, the encryption signal of FIG. 1 is transmitted in the form of the radio wave RW. Hereinafter, the mechanism for transmitting the encryption signal will be described, including the timing of converting the predetermined data into the encryption signal by the Y-00 optical communication quantum cryptography.

As shown in FIG. 1, the optical signal generation section 11 generates, as the optical signal, the multivalued information in the multivalued state based on the predetermined data. The ciphertext cannot be accurately acquired from the generated optical signal due to the effect of the shot noise even if the third party intercepts the optical signal. Specifically, the third party having intercepted the optical signal on the signal line LO1 acquires the optical signal as the O/E-converted electrical signal. At the timing of O/E conversion, the shot noise is caused due to the particle theory of light. Thus, the third party not having the algorithm of the Y-00 optical communication quantum cryptography and the cipher key thereof cannot decrypt the electrical signal to accurately acquire the ciphertext.

The signal transmission system 1 of the example of FIG. 1 converts the optical signal into the second electrical signal by the O/E conversion section 13. That is, as in O/E conversion by the third party as described above, the second electrical signal turns into the electrical signal with the shot noise at the timing of O/E conversion in the O/E conversion section 13. Further, the signal transmission system 1 transmits the second electrical signal from the radio wave transmission section 14. Thus, the radio wave RW is encrypted with the radio wave RW including the shot noise based on the frequency of the optical signal. That is, the shot noise is generated not based on the frequency of the radio wave RW but based on the frequency of the optical signal, and therefore, the electrical signal with a great noise masking amount Γ is generated.

The mechanism allowing application of the Y-00 optical communication quantum cryptography to the wireless communication will be described above in the present embodiment. At the above-described timing, e.g., the timing of O/E conversion by the third party having intercepted the optical signal or the timing of O/E conversion of the optical signal into the second electrical signal by the O/E conversion section 13, the predetermined data targeted for transmission is encrypted and turns into the encryption signal. With this configuration, the following advantageous effects can be provided.

Even in a case where the third party installs, e.g., the branch on the optical fiber to take out part of the signal power of the optical signal passing through the signal line LO1, the O/E-converted electrical signal includes the shot noise and is encrypted, and therefore, it is difficult for the third party to decrypt such a signal. Thus, the signal line LO1 can include, e.g., a long-distance optical fiber. That is, in a case where the signal line LO1 includes, e.g., the long-distance optical fiber, even if the third party maneuvers the optical fiber to intercept the optical signal, the safety can be ensured because of the encrypted optical signal. Thus, the optical signal generation section 11 and the O/E conversion section 13 can be placed at positions distant from each other.

Further, the optical signal amplification section 12 generally puts noise on the output optical signal when amplifying the optical signal. The optical signal amplification section 12 further puts the noise in addition to the above-described shot noise, and therefore, it is difficult for the third party to decrypt the signal even if the third party has acquired the signal on a line after the signal line LO1A because the optical signal is encrypted with greater noise.

Hereinafter, a specific example of the frequency of the signal to be input or output between the functional blocks in the signal transmission system 1 of the example of FIG. 1 will be described. Note that description will be made assuming that the frequency of the radio wave RW transmitted by the signal transmission system 1 is Center Frequency f0=fRF1 [Hz].

First, the electrical signal of the multivalued information in the multivalued state based on the Y-00 optical communication quantum cryptography is generated with a baseband (a signal with Center Frequency f0=0 [Hz]). That is, the first electrical signal output from the Y-00 cipher output section 111 and transmitted via the signal line LE11 is a signal with Center Frequency f0=0 [Hz], for example.

Next, the first electrical signal is converted into the optical signal by E/O conversion performed by direct laser modulation or a combination of a laser and various modulation elements. In this manner, the first electrical signal with Center Frequency f0=0 [Hz] is converted into the optical signal having a laser frequency as the center frequency. That is, the E/O conversion section 112 includes a not-shown laser light source, for example. The laser light source of the E/O conversion section 112 generates a unicolor (unmodulated) carrier wave with a frequency fsig. The E/O conversion section 112 modulates the unicolor carrier wave with the frequency fsig into the optical signal with Center Frequency f0=fsig. In this manner, the E/O conversion section 112 converts the first electrical signal into the optical signal.

Next, the optical signal is converted into the electrical signal again by O/E conversion using an optical member and a photodetector (a plurality of photodetectors in some cases) necessary for reception. That is, the O/E conversion section 13 includes a not-shown optical member and one or more photodetectors, for example. The O/E conversion section 13 in general optical fiber communication converts the optical signal into the second electrical signal with Center Frequency f0=0.

As described above, the second electrical signal merely turns into the signal with Center Frequency f0=0 [Hz] only by O/E conversion, and for this reason, the radio wave RW, which is the desired form transmitted by the signal transmission system 1, with Center Frequency f0=fRF1 cannot be directly transmitted. Thus, by the later-described configuration of the signal transmission system 1 with reference to FIGS. 4 to 8, the radio wave transmission section 14 can obtain the electrical signal with the frequency of the radio wave RW used in the wireless communication.

Next, a specific example of the frequency of the signal to be input or output between the functional blocks in the signal reception system 2 of the example of FIG. 1 will be described. Note that description will be made assuming that the frequency of the radio wave RW received by the signal reception system 2 is Center Frequency f0=fRF2 [Hz]. This is because different frequencies can be employed between the signal transmission system 1 and the signal reception system 2. For example, it can be configured such that a not-shown radio wave relay apparatus relays the radio wave RW as a radio wave with a different center frequency. Note that the signal reception system 2 can receive the radio wave RW with the same frequency (Center Frequency f0=fRF1 [Hz]) as that of the radio wave RW transmitted by the signal transmission system 1, needless to say.

In reception, the signal reception system 2 receives the wireless signal (in this case, the encryption signal) with Center Frequency f0=fRF2, and thereafter, performs E/O conversion and O/E conversion by a process opposite to that on a transmission side to obtain the encryption signal (the signal with Center Frequency f0=0 [Hz]) with the baseband. Note that in the present embodiment, the signal transmission/reception system includes the signal transmission system 1 and the signal reception system 2, but the signal transmission system 1 may be a signal processing system having a function relating to signal reception and being capable of transmitting and receiving a signal. In this case, in the transmission/reception system including two or more signal processing systems, communication using the encryption signal in the form of the radio wave RW can be performed regardless of a communication direction. In this case, in the signal processing systems capable of transmitting and receiving the signal, the radio wave reception section, the radio wave transmission section (an antenna), the transmission path, such as an optical fiber, between the E/O conversion section and the O/E conversion section, etc. may be shared by the reception and transmission sides. Note that in the signal transmission/reception system including two or more signal processing systems, use of an encryption signal can be limited only to one direction.

As described above, the transmission and reception configurations of the signal processing systems are not necessarily symmetrical with each other. For example, in a case where the signal reception system is an antenna relay station, the signal may be received by the antenna (the radio wave reception section), and after operation such as amplification, may be transmitted again via the antenna (the radio wave transmission section). Particularly, in a case where the signal reception system 2 is, e.g., a terminal such as a PC, it is also assumed that only electrical processing is performed without E/O conversion and O/E conversion. That is, the third electrical signal received by the radio wave reception section 21 may be input to the Y-00 cipher input section 25. At this point, the third electrical signal may be converted into a center frequency suitable for the Y-00 cipher input section 25, as necessary.

Hereinafter, a specific example where the first electrical signal (the signal with Center Frequency f0=0 [Hz]) output from the Y-00 cipher output section 111 of the signal transmission system 1 is converted into the signal (the signal with Center Frequency f0=fRF [Hz]) in the form of the radio wave RW output from the radio wave transmission section 14 will be described with reference to FIGS. 4 to 8.

Figure 4:
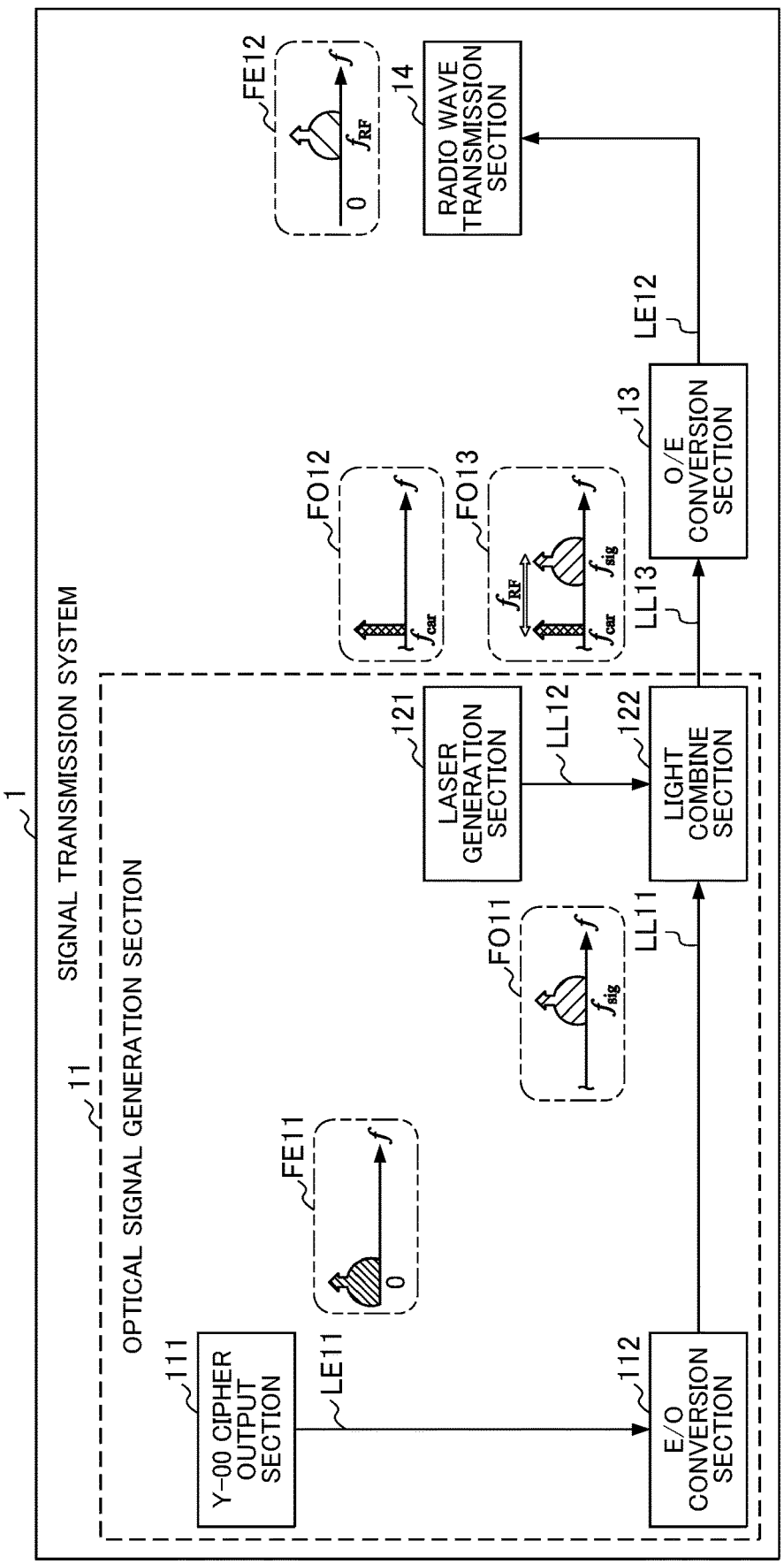
FIG. 4 is a block diagram showing a detailed configuration example in an example where a baseband heterodyne method is employed for the signal transmission system of FIG. 1.

FIG. 4 is a block diagram showing a detailed configuration example in an example where a baseband heterodyne method is employed for the signal transmission system of FIG. 1. The signal transmission system 1 of the example of FIG. 4 further includes, in addition to the sections of the signal transmission system 1 of the example of FIG. 1, a laser generation section 121, a light combine section 122, and signal lines LL11 to LL13 connected to the laser generation section 121 and the light combine section 122.

The Y-00 cipher output section 111 outputs, as a baseband signal (a signal with Center Frequency f0=0 [Hz]), a first electrical signal of multivalued information for modulating at least one of the phase or amplitude of light based on the Y-00 optical communication quantum cryptography protocol from predetermined data targeted for transmission and a private key. A frequency included in the first electrical signal shows distribution as in a graph FE11, for example.

The distribution shown by the graph FE11 conceptually shows a frequency included in a signal. The distribution shown by the graph FE11 takes a frequency f as the horizontal axis. An upward arrow in the distribution shown by the graph FE11 indicates that the frequency at the position of such an arrow is included much. That is, the distribution shown by the graph FE11 shows the signal with Center Frequency f0=0 [Hz]. Moreover, in the distribution shown by the graph FE11, a semispherical shape around the upward arrow indicates that a signal to be modulated has frequency distribution around the signal with Center Frequency f0=0 [Hz]. Hereinafter, an arrow, a semispherical shape, etc. in distribution shown by each group have meaning similar to that of the above-described graph FE11.

That is, referring to the distribution of the graph FE11, the first electrical signal is a signal including information for modulating at least one of the phase or amplitude of light.

The E/O conversion section 112 converts, by proper E/O conversion according to the modulation method, the first electrical signal into an optical signal with Center Frequency f0=fsig. The optical signal of the example of FIG. 4 is transmitted to the light combine section 122 via the signal line LL11 including, e.g., an optical fiber. Note that the E/O conversion section 112 is configured to modulate one or both of the phase and amplitude of light by a combination of a not-shown laser generation section and, e.g., a phase modulator, a Mach-Zehnder modulator, or an IQ modulator. Alternatively, the E/O conversion section 112 may include a not-shown modulation laser generation section to directly output a modulated optical signal.

A frequency included in the optical signal output from the E/O conversion section 112 shows distribution as in a graph FO11, for example. Referring to the graph FO11, the optical signal is a signal with Center Frequency f0=fsig. Moreover, the optical signal has distribution at a frequency around the center frequency f0. That is, the optical signal is a phase-modulated signal with Center Frequency f0=fsig.

The laser generation section 121 generates unicolor laser light with Optical Signal Frequency f=fsig−fRF. That is, the laser generation section 121 generates unicolor laser light (also called carrier light as necessary) with Frequency f=fcar, the unicolor laser light being apart from Center Frequency f0=fsig in the optical signal by Frequency f=fRF desired to be transmitted as a wireless signal. The carrier light of the example of FIG. 4 is transmitted to the light combine section 122 via the signal line LL12 including, e.g., an optical fiber.

The frequency included in the carrier light generated from the laser generation section 121 shows distribution as in a graph FO12, for example. Referring to the graph FO12, the carrier light is a signal with Frequency f0=fcar. Moreover, the carrier light has no distribution at a frequency around the center frequency f0. That is, the carrier light is a unicolor signal with Frequency f=fcar.

The light combine section 122 combines the optical signal and the carrier light. That is, an optical signal obtained by combination of the optical signal transmitted via the signal line LL11 and the carrier light transmitted via the signal line LL12 is output. The combined optical signal of the example of FIG. 4 is transmitted to the O/E conversion section 13 via the signal line LL13 including, e.g., an optical fiber. Note that the light combine section 122 may include an optical power combiner or an optical wavelength multiplier, for example.

A frequency included in the combined optical signal output from the light combine section 122 shows distribution as in a graph FO13, for example. Referring to the graph FO13, the combined optical signal includes the signal with Center Frequency f0=fcar and the signal with Center Frequency f0=fsig. Moreover, distribution is shown at a frequency around Center Frequency f0=fsig in the combined optical signal. That is, combined light is an optical signal including the signal subjected to modulation of at least one of the phase or amplitude of light and having Center Frequency f0=fsig and the unicolor signal with Center Frequency f=fcar.

The O/E conversion section 13 converts the combined optical signal into a second electrical signal. As the second electrical signal, an encryption signal with Frequency f=fRF (a desired frequency to be wirelessly transmitted) as a beat component of two frequencies is generated.

The frequency of the second electrical signal converted by the O/E conversion section 13 shows distribution as in a graph FE12, for example. Referring to the graph FE12, the second electrical signal is a signal with Center Frequency f0=fRF. Moreover, the second electrical signal has distribution at a frequency around the center frequency f0.

The radio wave transmission section 14 transmits the second electrical signal as the encryption signal in the form of a radio wave RW.

The specific example of each functional block in the signal transmission system 1 and the specific example of the frequency of each signal to be input or output between the functional blocks in the case of employing the baseband heterodyne method of the example of FIG. 4 have been described above.

With the above-described configuration, the first electrical signal generated with the baseband (the signal with Center Frequency f0=0 [Hz]) is converted into the second electrical signal (in this case, the encryption signal) with Center Frequency f0=fRF as the frequency of the radio wave RW to be transmitted, and the second electrical signal is transmitted in the form of the radio wave RW.

Note that an optical transmission medium such as an optical fiber or a component that operates a signal in an optical range, such as an optical filter or an optical amplifier, may be inserted into between the E/O conversion section 112 and the light combine section 122, as necessary. Similarly, an optical transmission medium such as an optical fiber or a component that operates a signal in an optical range, such as an optical filter or an optical amplifier, may be also inserted into between the laser generation section 121 that generates the carrier light and the light combine section 122, as necessary. Moreover, an optical transmission medium such as an optical fiber or a component that operates a signal in an optical range, such as an optical filter or an optical amplifier, may be also inserted into between the light combine section 122 and the O/E conversion section 13, as necessary. Further, in addition to a transmission medium such as an RF transmission cable, a component such as a filter or an amplifier for the frequency band of fRF may be inserted into between the O/E conversion section 13 and the radio wave transmission section 14, as necessary.

Figure 5:
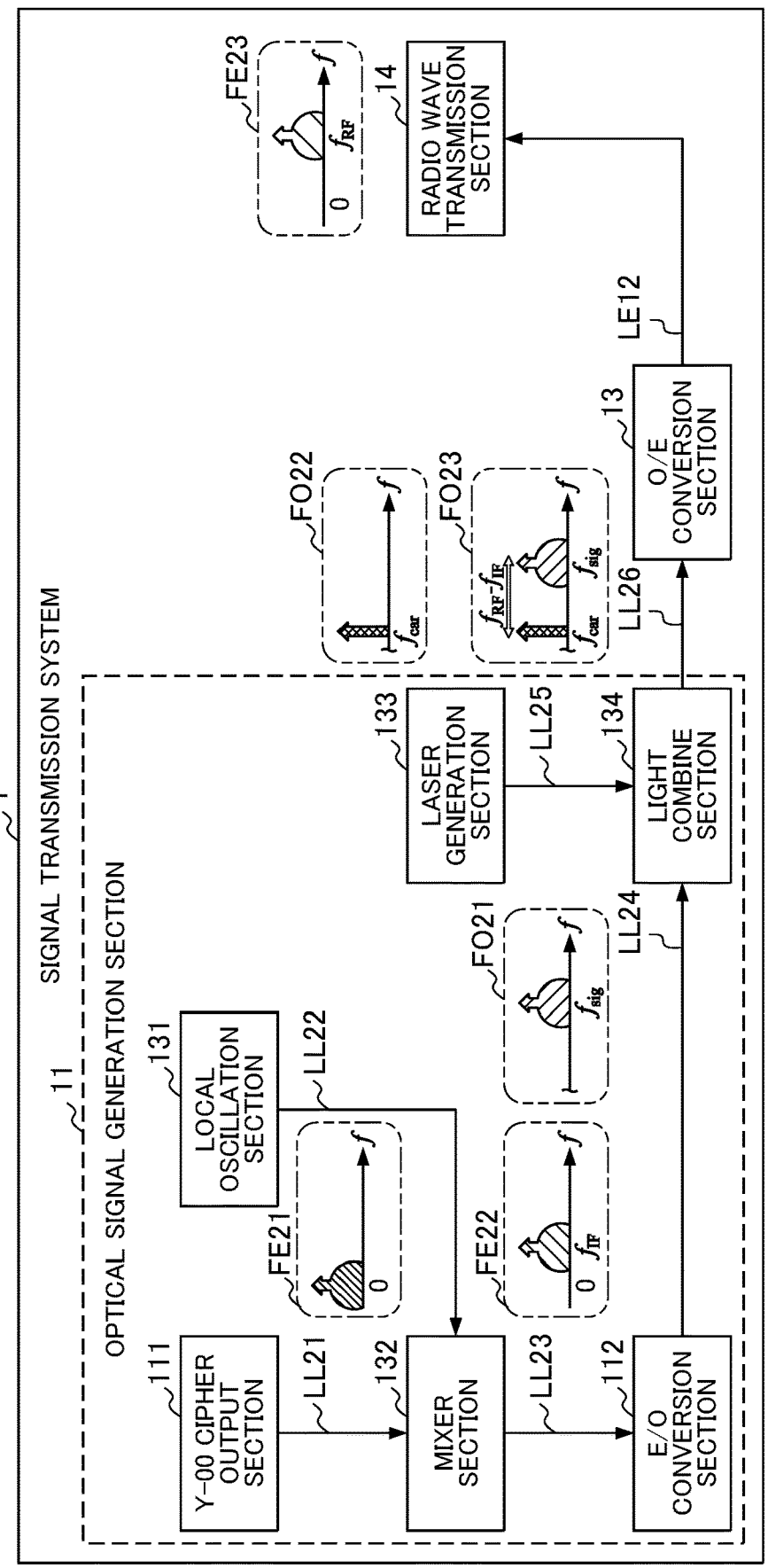
FIG. 5 is a block diagram showing a detailed configuration example in an example where an intermediate-frequency heterodyne method is employed for the signal transmission system of FIG. 1.

FIG. 5 is a block diagram showing a detailed configuration example in an example where an intermediate-frequency heterodyne method is employed for the signal transmission system of FIG. 1. The signal transmission system 1 of the example of FIG. 5 further includes, in addition to the sections of the signal transmission system 1 of the example of FIG. 1, a local oscillation section 131, a mixer section 132, a laser generation section 133, a light combine section 134, and signal lines LL21 to LL26.

The function and configuration of the Y-00 cipher output section 111 of the example of FIG. 5 are basically similar to the function and configuration of the Y-00 cipher output section 111 of the example of FIG. 4, and therefore, description thereof will be omitted. That is, a frequency included in a first electrical signal shows, for example, distribution as in a graph FE21 and such distribution is basically similar to the distribution shown by the graph FE11 of the example of FIG. 4, and therefore, description thereof will be omitted. The first electrical signal output from the Y-00 cipher output section 111 is transmitted to the mixer section 132 via the signal line LL21.

The local oscillation section 131 oscillates a local oscillation signal corresponding to a later-described intermediate frequency fIF. The local oscillation signal oscillated by the local oscillation section 131 is transmitted to the mixer section 132 via the signal line LL22.

The mixer section 132 mixes the first electrical signal and the local oscillation signal to output an intermediate-frequency electrical signal having, as a center frequency, Frequency f=fIF which is the intermediate frequency. The intermediate-frequency electrical signal is transmitted to the E/O conversion section 112 via the signal line LL23. Note that the mixer section 132 has a configuration according to the modulation method and outputs the intermediate-frequency electrical signal from the first electrical signal and the local oscillation signal. That is, a specific configuration of the mixer section 132 may be according to the modulation method such as intensity modulation, amplitude modulation, phase modulation, frequency modulation, or quadrature amplitude modulation.

The frequency included in the intermediate-frequency electrical signal output from the mixer section 132 shows distribution as in a graph FE22, for example. Referring to the graph FE22, the intermediate-frequency electrical signal is a signal with Center Frequency f0=fIF. Moreover, the intermediate-frequency electrical signal has distribution at a frequency around the center frequency f0. That is, the intermediate-frequency electrical signal is a signal having information for modulating at least one of the phase or amplitude of light and having Center Frequency f0=fIF.

The E/O conversion section 112 converts the intermediate-frequency electrical signal into an optical signal with Center Frequency f0=fsig by proper E/O conversion according to the modulation method. The other functions and configurations of the E/O conversion section 112 of FIG. 5 are basically similar to the functions and configurations of the E/O conversion section 112 of the example of FIG. 4, and therefore, description thereof will be omitted. The frequency included in the optical signal shows, for example, distribution as in a graph FO21 and such distribution is basically similar to the distribution shown by the graph FO11 of the example of FIG. 4, and therefore, description thereof will be omitted. The optical signal output from the E/O conversion section 112 is transmitted to the light combine section 134 via the signal line LL24 including, e.g., an optical fiber.

The laser generation section 133 generates unicolor laser light with Optical Signal Frequency f=fsig−fRF+fIF. That is, the laser generation section 121 generates unicolor laser light (also called carrier light as necessary) with Frequency f=fcar=fsig−fRF+fIF, the unicolor laser light being apart from Center Frequency f0=fsig in the optical signal by a difference between Frequency f=fRF desired to be transmitted as a wireless signal and the intermediate frequency fIF. The carrier light of the example of FIG. 4 is transmitted to the light combine section 134 via the signal line LL25 including, e.g., an optical fiber.

The frequency included in the carrier light generated from the laser generation section 133 shows distribution as in a graph FO23, for example. Referring to the graph FO23, the carrier light is a signal with Center Frequency f0=fcar. Moreover, the carrier light has no distribution at a frequency around the center frequency f0. That is, the carrier light is a unicolor signal with Frequency f=fcar.

The light combine section 134 combines the optical signal and the carrier light. That is, an optical signal obtained by combination of the optical signal transmitted via the signal line LL24 and the carrier light transmitted via the signal line LL25 is output. The combined optical signal of the example of FIG. 5 is transmitted to the O/E conversion section 13 via the signal line LL26 including, e.g., an optical fiber. Note that the light combine section 134 may include an optical power combiner or an optical wavelength multiplier, for example.

A frequency included in the combined optical signal output from the light combine section 134 shows distribution as in a graph FO23, for example. Referring to the graph FO23, the combined optical signal includes the signal with Center Frequency f0=fcar and the signal with Center Frequency f0=fsig. Moreover, there is distribution at a frequency around Center Frequency f0=fsig in the combined optical signal. That is, the combined light is an optical signal including the frequency-modulated signal with Center Frequency f0=fcar and the unicolor signal with Frequency f=fsig. Note that Carrier Light Frequency f=fcar=fsig−fRF+fIF is satisfied as described above, and therefore, a frequency difference between the frequency-modulated signal with Center Frequency f0=fcar and the unicolor signal with Frequency f=fsig is fRF−fIF.

The O/E conversion section 13 converts the combined optical signal into a second electrical signal. As the second electrical signal, an encryption signal with Frequency f=fRF−fIF as a beat component of two frequencies is generated. Note that the phase-modulated signal with Center Frequency f0=fIF, i.e., the intermediate-frequency electrical signal, is input to the E/O conversion section 112, and therefore, the center frequency of the second electrical signal is a frequency obtained by addition of fIF. That is, the second electrical signal has Frequency f=fRF−fIF as the beat component and fIF is added to the center frequency, and therefore, the second electrical signal is a signal with Center Frequency f0=fRF.

Each function and configuration of the radio wave transmission section 14 and the signal line LE12 are basically similar to each function and configuration of the radio wave transmission section 14 and the signal line LE12 of FIG. 4, and therefore, description thereof will be omitted. The frequency included in the second electrical signal transmitted via the signal line LE12 shows, for example, distribution as in a graph FE23 and such distribution is basically similar to the distribution shown by the graph FE12 of the example of FIG. 4, and therefore, description thereof will be omitted. With this configuration, the radio wave transmission section 14 transmits the second electrical signal as the encryption signal in the form of a radio wave RW.

Note that as in the example of FIG. 4, an optical transmission medium such as an optical fiber or a component that operates a signal in an optical range, such as an optical filter or an optical amplifier, may be inserted into between the E/O conversion section 112 and the light combine section 134, between the laser generation section 133 and the light combine section 134, and between the light combine section 134 and the O/E conversion section 13, as necessary. Further, in addition to a transmission medium such as an RF transmission cable, a component such as a filter or an amplifier for the frequency band of fRF may be, as in the example of FIG. 4, inserted into between the O/E conversion section 13 and the radio wave transmission section 14, as necessary.

The specific example of each functional block in the signal transmission system 1 and the specific example of the frequency of each signal to be input or output between the functional blocks in the case of employing the intermediate-frequency heterodyne method of the example of FIG. 5 have been described above.

With the above-described configuration, the first electrical signal generated with the baseband (the signal with Center Frequency f0=0 [Hz]) is converted into the second electrical signal (in this case, the encryption signal) with Center Frequency f0=fRF as the frequency of the radio wave RW to be transmitted via the intermediate-frequency electrical signal, and the second electrical signal is transmitted in the form of the radio wave RW.

With conversion into the intermediate-frequency electrical signal, the E/O conversion section 112 can have a relatively-simple configuration such as a combination of a laser and a light intensity modulator (a Mach-Zehnder modulator or an electro-absorption modulator) or direct laser modulation. That is, as compared to the case of converting the first electrical signal generated with the baseband into the optical signal, the E/O conversion section 112 can perform conversion by a relatively-simple (i.e., relatively-inexpensive) configuration in conversion of the intermediate-frequency electrical signal into the optical signal.

Figure 6:
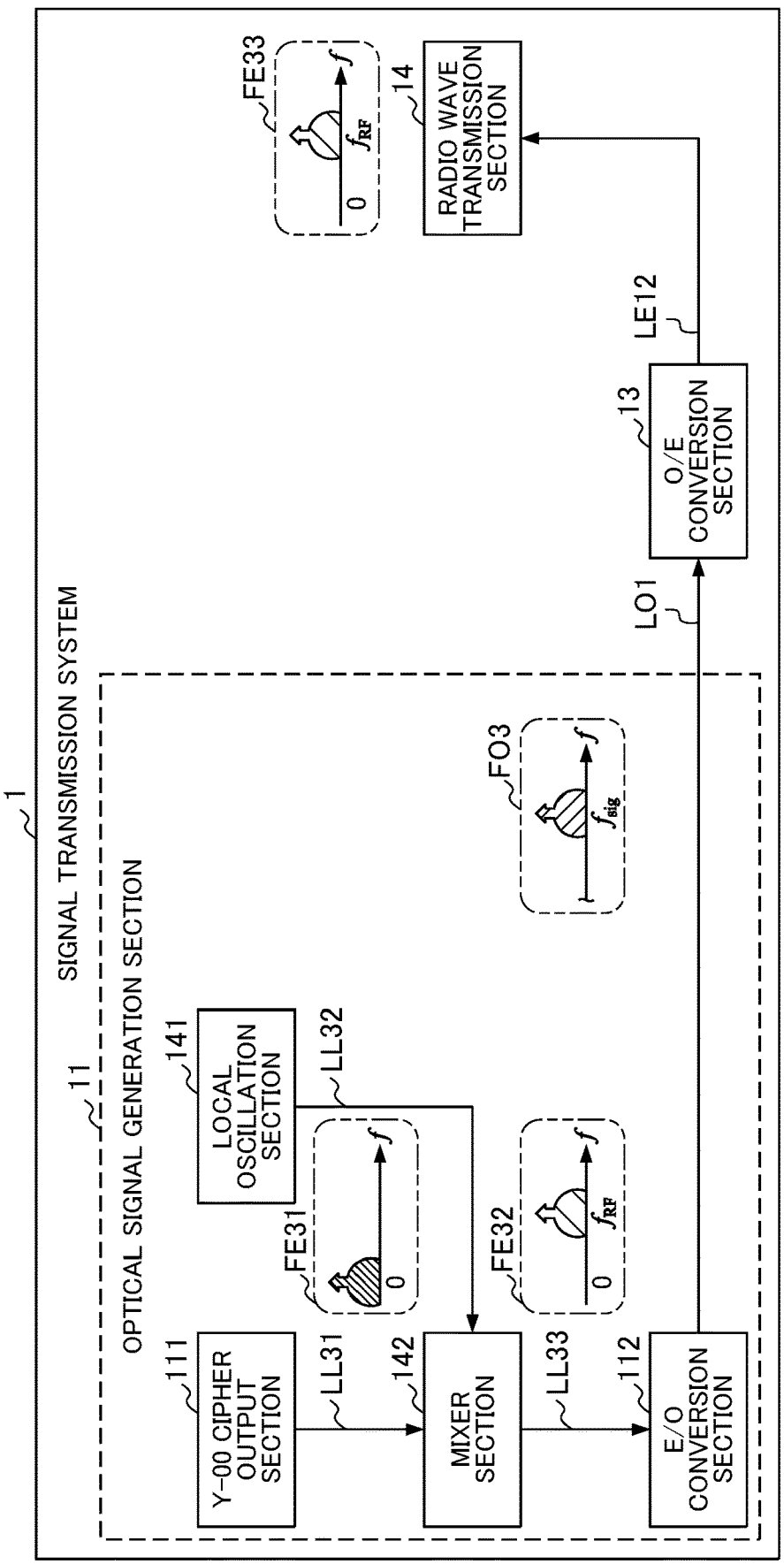
FIG. 6 is a block diagram showing a detailed configuration example in an example where an analog direct-modulation method is employed for the signal transmission system of FIG. 1.

FIG. 6 is a block diagram showing a detailed configuration example in an example where an analog direct-modulation method is employed for the signal transmission system of FIG. 1. The signal transmission system 1 of the example of FIG. 6 further includes, in addition to the sections of the signal transmission system 1 of the example of FIG. 1, a local oscillation section 141, a mixer section 142, and signal lines LL31 to LL33.

The function and configuration of the Y-00 cipher output section 111 of the example of FIG. 6 are basically similar to the function and configuration of the Y-00 cipher output section 111 of the example of FIG. 4, and therefore, description thereof will be omitted. That is, a frequency included in a first electrical signal shows, for example, distribution as in a graph FE31 and such distribution is basically similar to the distribution shown by the graph FE11 of the example of FIG. 4, and therefore, description thereof will be omitted. The first electrical signal output from the Y-00 cipher output section 111 is transmitted to the mixer section 142 via the signal line LL31.

The local oscillation section 141 oscillates a local oscillation signal corresponding to a later-described intermediate frequency fRF. That is, the local oscillation section 141 of the example of FIG. 6 oscillates a local oscillation signal corresponding to fRF as the frequency of a radio wave RW which is the intermediate frequency. The local oscillation signal oscillated by the local oscillation section 141 is transmitted to the mixer section 142 via the signal line LL32.

The mixer section 142 mixes the first electrical signal and the local oscillation signal to output an intermediate-frequency electrical signal having, as a center frequency, Frequency f=fRF which is the intermediate frequency. That is, the frequency of the radio wave RW to be transmitted is employed as the intermediate frequency. The intermediate-frequency electrical signal is transmitted to the E/O conversion section 112 via the signal line LL33. Note that the mixer section 142 can have a configuration according to the modulation method and has a configuration basically similar to the example of the configuration of the mixer section 132 of the example of FIG. 5, and therefore, description thereof will be omitted.

The frequency included in the intermediate-frequency electrical signal output from the mixer section 142 shows distribution as in a graph FE32, for example. Referring to the graph FE32, the intermediate-frequency electrical signal is a signal with Center Frequency f0=fRF. Moreover, the intermediate-frequency electrical signal has distribution at a frequency around the center frequency f0. That is, the intermediate-frequency electrical signal is a signal having information for modulating at least one of the phase or amplitude of light and having Center Frequency f0=fRF.

The E/O conversion section 112 converts the intermediate-frequency electrical signal into an optical signal with Center Frequency f0=fsig by proper E/O conversion according to the modulation method. Other functions and configurations of the E/O conversion section 112 of FIG. 6 are basically similar to the functions and configurations of the E/O conversion section 112 of the example of FIG. 4, and therefore, description thereof will be omitted. The frequency included in the optical signal shows, for example, distribution as in a graph FO3 and such distribution is basically similar to the distribution shown by the graph FO11 of the example of FIG. 4, and therefore, description thereof will be omitted. The optical signal output from the E/O conversion section 112 is transmitted to the O/E conversion section 13 via the signal line LO1 including, e.g., an optical fiber.

The O/E conversion section 13 converts the optical signal into a second electrical signal. As the second electrical signal, an encryption signal with Intermediate Frequency f=fRF, i.e., the intermediate-frequency electrical signal, is generated. That is, the signal with Center Frequency f0=fRF as the intermediate frequency is input to the E/O conversion section 112, and therefore, the center frequency of the second electrical signal is a frequency obtained by addition of fRF from the first electrical signal generated with a baseband.

Each function and configuration of the radio wave transmission section 14 and the signal line LE12 are basically similar to each function and configuration of the radio wave transmission section 14 and the signal line LE12 of FIG. 4, and therefore, description thereof will be omitted. The frequency included in the second electrical signal transmitted via the signal line LE12 shows, for example, distribution as in a graph FE33 and such distribution is basically similar to the distribution shown by the graph FE12 of the example of FIG. 4, and therefore, description thereof will be omitted. With this configuration, the radio wave transmission section 14 transmits the second electrical signal as the encryption signal in the form of the radio wave RW.

Note that as in the example of FIG. 4, an optical transmission medium such as an optical fiber or a component that operates a signal in an optical range, such as an optical filter or an optical amplifier, may be inserted into between the E/O conversion section 112 and the O/E conversion section 13, as necessary. Further, in addition to a transmission medium such as an RF transmission cable, a component such as a filter or an amplifier for the frequency band of fRF may be, as in the example of FIG. 4, inserted into between the O/E conversion section 13 and the radio wave transmission section 14, as necessary.

The specific example of each functional block in the signal transmission system 1 and the specific example of the frequency of each signal to be input or output between the functional blocks in the case of employing the analog direct-modulation method of the example of FIG. 6 have been described above.

With the above-described configuration, the first electrical signal generated with the baseband (the signal with Center Frequency f0=0 [Hz]) is converted into the second electrical signal (in this case, the encryption signal) with Center Frequency f0=fRF as the frequency of the radio wave RW to be transmitted via the intermediate-frequency electrical signal, and the second electrical signal is transmitted in the form of the radio wave RW.

With conversion into the intermediate-frequency electrical signal, the E/O conversion section 112 can have a relatively-simple configuration such as a combination of a laser and a light intensity modulator (a Mach-Zehnder modulator or an electro-absorption modulator) or direct laser modulation. That is, as compared to the case of converting the first electrical signal generated with the baseband into the optical signal, the E/O conversion section 112 can perform conversion by a relatively-simple (i.e., relatively-inexpensive) configuration in conversion of the intermediate-frequency electrical signal into the optical signal.

Figure 7:
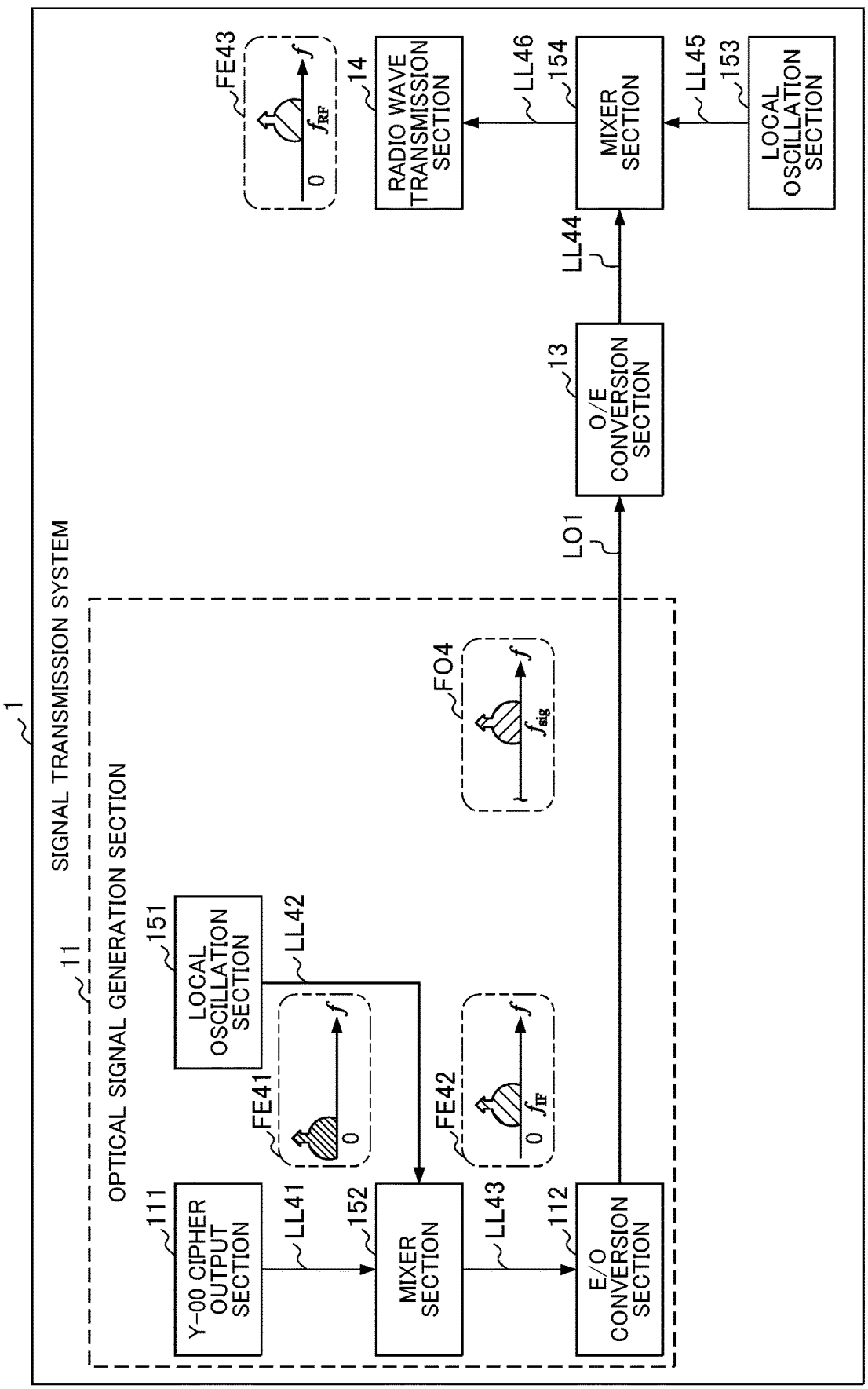
FIG. 7 is a block diagram showing a detailed configuration example in an example where an analog intermediate-frequency method is employed for the signal transmission system of FIG. 1.

FIG. 7 is a block diagram showing a detailed configuration example in an example where an analog intermediate-frequency method is employed for the signal transmission system of FIG. 1. The signal transmission system 1 of the example of FIG. 7 further includes, in addition to the sections of the signal transmission system 1 of the example of FIG. 1, a local oscillation section 151, a mixer section 152, a local oscillation section 153, a mixer section 154, and signal lines LL41 to LL46.

The function and configuration of the Y-00 cipher output section 111 of the example of FIG. 7 are basically similar to the function and configuration of the Y-00 cipher output section 111 of the example of FIG. 4, and therefore, description thereof will be omitted. That is, a frequency included in a first electrical signal shows, for example, distribution as in a graph FE41 and such distribution is basically similar to the distribution shown by the graph FE11 of the example of FIG. 4, and therefore, description thereof will be omitted. The first electrical signal output from the Y-00 cipher output section 111 is transmitted to the mixer section 152 via the signal line LL41.

Each function and configuration of the local oscillation section 151 and the mixer section 152 of the example of FIG. 7 are basically similar to each function and configuration of the local oscillation section 131 and the mixer section 132 of the example of FIG. 5, and therefore, description thereof will be omitted. That is, each frequency included in the first electrical signal and an intermediate-frequency electrical signal shows, for example, distribution as in each of a graph FE41 and a graph FE42 and such distribution is basically similar to the distribution shown by each of the graph FE21 and the graph FE22 of the example of FIG. 5, and therefore, description thereof will be omitted. The intermediate-frequency electrical signal is transmitted to the E/O conversion section 112 via the signal line LL43. Note that in the example of FIG. 7, a local oscillation signal oscillated by the local oscillation section 151 will be hereinafter referred to as a "first local oscillation signal" for clearly distinguishing the first local oscillation signal from a later-described second local oscillation signal.

The E/O conversion section 112 converts the intermediate-frequency electrical signal into an optical signal with Center Frequency f0=fsig by proper E/O conversion according to the modulation method. Other functions and configurations of the E/O conversion section 112 of FIG. 5 are basically similar to the functions and configurations of the E/O conversion section 112 of the example of FIG. 4, and therefore, description thereof will be omitted. The frequency included in the optical signal shows, for example, distribution as in a graph FO4 and such distribution is basically similar to the distribution shown by the graph FO11 of the example of FIG. 4, and therefore, description thereof will be omitted. The optical signal output from the E/O conversion section 112 is transmitted to the O/E conversion section 13 via the signal line LO1 including, e.g., an optical fiber.

The O/E conversion section 13 converts the optical signal into a second electrical signal. As the second electrical signal, an encryption signal with Intermediate Frequency f=fIF, i.e., the intermediate-frequency electrical signal, is generated. That is, the phase-modulated signal with Center Frequency f0=fIF, i.e., the intermediate-frequency electrical signal, is input to the E/O conversion section 112, and therefore, the center frequency of the second electrical signal is a frequency obtained by addition of fIF from the first electrical signal generated with a baseband. The second electrical signal output from the O/E conversion section 13 is transmitted to the mixer section 154 via the signal line LL44.

The local oscillation section 153 oscillates a local oscillation signal (hereinafter referred to as a "second local oscillation signal" for clearly distinguishing the second local oscillation signal from the above-described first local oscillation signal) corresponding to the intermediate frequency fRF−fIF. That is, the local oscillation section 153 of the example of FIG. 7 oscillates the second local oscillation signal corresponding to a difference between fRF which is the frequency of a radio wave RW as the intermediate frequency and Center Frequency f0=fIF in the first local oscillation signal. The second local oscillation signal oscillated by the local oscillation section 153 is transmitted to the mixer section 154 via the signal line LL45.

The mixer section 154 mixes the second electrical signal and the second local oscillation signal to output an electrical signal with fRF which is the frequency of the radio wave RW as the intermediate frequency. That is, the center frequency of the electrical signal mixed by the mixer section 154 is Center Frequency f0=fRF obtained by addition of the frequency obtained by addition of fIF from the first electrical signal generated with a baseband and the second local oscillation signal corresponding to Intermediate Frequency fRF−fIF. That is, the frequency of the radio wave RW to be transmitted is output as the electrical signal mixed by the mixer section 154. The mixed electrical signal is transmitted to the radio wave transmission section 14 via the signal line LL46. Note that the mixer section 154 can have a configuration according to the modulation method and has a configuration basically similar to the example of the configuration of the mixer section 132 of the example of FIG. 5, and therefore, description thereof will be omitted.

The frequency included in the electrical signal mixed and output by the mixer section 154 shows, for example, distribution as in a graph FE43 and such distribution is basically similar to the distribution shown by the graph FE12 of the example of FIG. 4, and therefore, description thereof will be omitted.

The function and configuration of the radio wave transmission section 14 are basically similar to the function and configuration of the radio wave transmission section 14 of FIG. 4, and therefore, description thereof will be omitted. With this configuration, the radio wave transmission section 14 transmits the mixed electrical signal as an encryption signal in the form of the radio wave RW Note that as in the example of FIG. 4, an optical transmission medium such as an optical fiber or a component that operates a signal in an optical range, such as an optical filter or an optical amplifier, may be inserted into between the E/O conversion section 112 and the light combine section 134, between the laser generation section 133 and the light combine section 134, and between the light combine section 134 and the O/E conversion section 13, as necessary. Further, in addition to a transmission medium such as an RF transmission cable, a component such as a filter or an amplifier for the frequency band of fRF may be, as in the example of FIG. 4, inserted into between the O/E conversion section 13 and the radio wave transmission section 14, as necessary.

Note that as in the example of FIG. 4, an optical transmission medium such as an optical fiber or a component that operates a signal in an optical range, such as an optical filter or an optical amplifier, may be inserted into between the E/O conversion section 112 and the O/E conversion section 13, as necessary. Further, in addition to a transmission medium such as an RF transmission cable, a component such as a filter or an amplifier for the frequency band of fRF may be, as in the example of FIG. 4, inserted into between the O/E conversion section 13 and the mixer section 154 and between the mixer section 154 and the radio wave transmission section 14, as necessary.

The specific example of each functional block in the signal transmission system 1 and the specific example of the frequency of each signal to be input or output between the functional blocks in the case of employing the analog intermediate-frequency method of the example of FIG. 7 have been described above.

With the above-described configuration, the first electrical signal generated with the baseband (the signal with Center Frequency f0=0 [Hz]) is converted into the mixed electrical signal (in this case, the encryption signal) with Center Frequency f0=fRF as the frequency of the radio wave RW to be transmitted via the intermediate-frequency electrical signal, and the mixed electrical signal is transmitted in the form of the radio wave RW.

Figure 8:
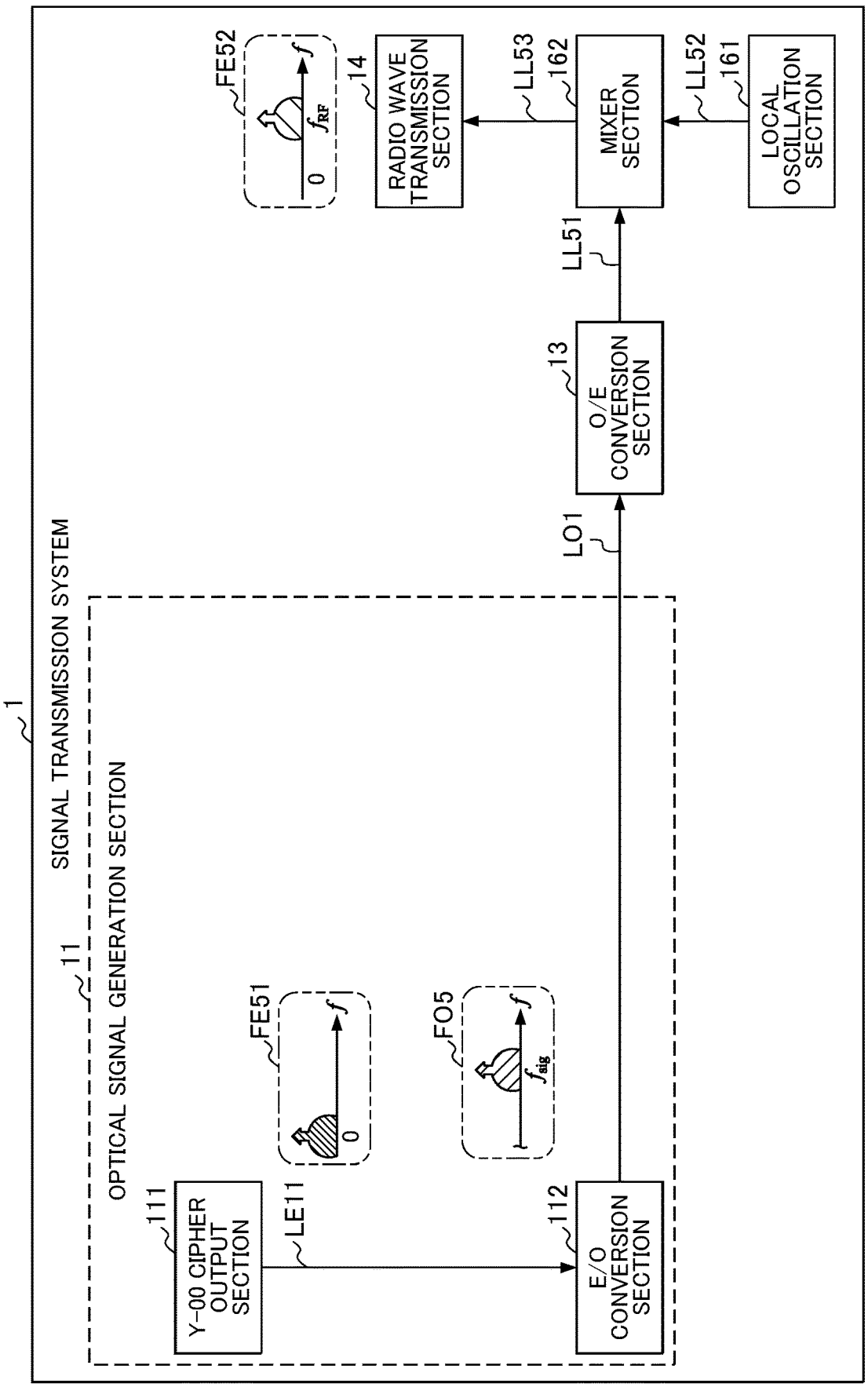
FIG. 8 is a block diagram showing a detailed configuration example in an example where an analog baseband method is employed for the signal transmission system of FIG. 1.

FIG. 8 is a block diagram showing a detailed configuration example in an example where an analog baseband method is employed for the signal transmission system of FIG. 1. The signal transmission system 1 of the example of FIG. 8 further includes, in addition to the sections of the signal transmission system 1 of the example of FIG. 1, a local oscillation section 161, a mixer section 162, and signal lines LL51 to LL53.

The function and configuration of the Y-00 cipher output section 111 of the example of FIG. 8 are basically similar to the function and configuration of the Y-00 cipher output section 111 of the example of FIG. 4, and therefore, description thereof will be omitted. That is, a frequency included in a first electrical signal shows, for example, distribution as in a graph FE51 and such distribution is basically similar to the distribution shown by the graph FE11 of the example of FIG. 4, and therefore, description thereof will be omitted. The first electrical signal output from the Y-00 cipher output section 111 is transmitted to the E/O conversion section 112 via the signal line LE11.

The function and configuration of the E/O conversion section 112 of the example of FIG. 8 are basically similar to the function and configuration of the E/O conversion section 112 of the example of FIG. 4, and therefore, description thereof will be omitted. That is, a frequency included in an optical signal shows, for example, distribution as in a graph FO5 and such distribution is basically similar to the distribution shown by the graph FO11 of the example of FIG. 4, and therefore, description thereof will be omitted. The optical signal converted by the E/O conversion section 112 is transmitted to the O/E conversion section 13 via the signal line LO1 including, e.g., an optical fiber.

The O/E conversion section 13 converts the optical signal into a second electrical signal. As the second electrical signal, an encryption signal with Center Frequency f0=0 [Hz] as in the first electrical signal is generated. The second electrical signal converted by the O/E conversion section 13 is transmitted to the mixer section 162 via the signal line LL51.

The local oscillation section 161 oscillates a local oscillation signal corresponding to an intermediate frequency fRF. That is, the local oscillation section 161 of the example of FIG. 8 oscillates a local oscillation signal corresponding to fRF which is the frequency of a radio wave RW as the intermediate frequency. The local oscillation signal oscillated by the local oscillation section 161 is transmitted to the mixer section 162 via the signal line LL52.

The mixer section 162 mixes the second electrical signal and the local oscillation signal to output an electrical signal with fRF which is the frequency of the radio wave RW as the intermediate frequency. That is, the center frequency of the electrical signal mixed by the mixer section 162 is Center Frequency f0=fRF obtained by addition of Center Frequency f0=0 [Hz] similar to that of the first electrical signal generated with a baseband and the local oscillation signal corresponding to the intermediate frequency fRF. That is, the frequency of the radio wave RW to be transmitted is output as the electrical signal mixed by the mixer section 162. The mixed electrical signal is transmitted to the radio wave transmission section 14 via the signal line LL53. Note that the mixer section 162 can have a configuration according to the modulation method and have a configuration basically similar to the example of the configuration of the mixer section 132 of the example of FIG. 5, and therefore, description thereof will be omitted.

The frequency included in the electrical signal mixed and output by the mixer section 162 shows, for example, distribution as in a graph FE52 and such distribution is basically similar to the distribution shown by the graph FE12 of the example of FIG. 4, and therefore, description thereof will be omitted.

The function and configuration of the radio wave transmission section 14 are basically similar to the function and configuration of the radio wave transmission section 14 of FIG. 4, and therefore, description thereof will be omitted. With this configuration, the radio wave transmission section 14 transmits the mixed electrical signal as the encryption signal in the form of the radio wave RW.

Note that as in the example of FIG. 4, an optical transmission medium such as an optical fiber or a component that operates a signal in an optical range, such as an optical filter or an optical amplifier, may be inserted into between the E/O conversion section 112 and the O/E conversion section 13, as necessary. Further, in addition to a transmission medium such as an RF transmission cable, a component such as a filter or an amplifier for the frequency band of fRF may be, as in the example of FIG. 4, inserted into between the O/E conversion section 13 and the mixer section 154 and between the mixer section 154 and the radio wave transmission section 14, as necessary.

Various embodiments of the signal transmission system 1 to which the present invention is applied have been described above. However, it is enough for the signal transmission system 1 to which the present invention is applied to output an electrical signal with a great noise masking amount Γ in the form of the radio wave RW, and such a configuration is not limited to various embodiments above and may be the following configurations, for example.

For example, for the sake of convenience in description in the above-described embodiments, the signal transmission system 1 encrypts the signal targeted for transmission to transmit the signal in the form of the radio wave RW and the signal reception system 2 receives and decrypts the radio wave RW to receive the signal in the above-described form, but the present invention is not limited to above. For example, the signal processing system may have both of the configuration relating to transmission of the radio wave RW and the configuration relating to reception of the radio wave RW so that the encryption signal in the form of the radio wave RW can be transmitted/received.

For example, in the above-described embodiments, the signal transmission/reception system includes the signal transmission system 1 and the signal reception system 2, but the present invention is not limited to above. For example, the signal transmission/reception system may include a plurality of signal processing systems capable of transmitting/receiving an encryption signal in the form of a radio wave RW. With this configuration, the signal processing system can form a network.

For example, in the above-described embodiments, the Y-00 cipher output section 111 of the optical signal generation section 11 obtains the multivalued information from the predetermined data targeted for transmission based on the Y-00 optical communication quantum cryptography protocol, but the present invention is not limited to above. That is, in the above-described embodiments, the multivalued information is generated from the predetermined data targeted for transmission and the private key based on the Y-00 optical communication quantum cryptography protocol, but the present invention is not limited to above. Specifically, the optical signal generation section 11 may generate multivalued information from predetermined data targeted for transmission and a predetermined common key, for example. For example, multivalued information may be generated from predetermined data targeted for transmission and a predetermined rule, for example. That is, it is enough for the optical signal generation section 11 to generate multivalued information based on an optional protocol.

For example, in description of the present embodiment, the noise masking amount $\Gamma$ is the "number of symbol points within a standard deviation range when shot noise distribution is approximated as Gaussian distribution", but the present invention is not limited to above. That is, it is enough that the noise masking amount $\Gamma$ is the number of symbol points within an optional noise area. Specifically, the noise in the noise masking amount $\Gamma$ may include any noise including classical noise such as thermal noise, for example. The range for the noise masking amount $\Gamma$ is not limited to the standard deviation range when the noise distribution is approximated as the Gaussian distribution. Specifically, distribution may be acquired by actual noise measurement, and the dispersion of the acquired distribution may be taken as a range. That is, the noise masking amount $\Gamma$ is not limited to Expression (1) above which is the expression in the case of employing the phase modulation method.

In summary, it is enough that the distance between two adjacent symbol points is sufficiently shorter than the area of any noise including classical noise such as thermal noise. That is, it is enough that for the optical signal generated by the optical signal generation section 11, the noise masking amount by all types of "noise" including classical noise such as thermal noise is equal to or greater than 1.

For example, in the above-described embodiments, the blocks showing the detailed configuration examples in the examples employing various methods for the signal transmission system 1 have been described with reference to FIGS. 4 to 8, but the present invention is not limited to above. For example, the signal processing may be performed with plural levels of intermediate frequencies being provided as an intermediate frequency. For example, combination of the laser light by the light combine section and acquisition of the beat component may be repeated multiple times. That is, the signal transmission system 1 may include an optional number of mixer sections or light combine sections. In other words, it is enough that shot noise based not on the frequency of a radio wave RW but on the frequency of an optical signal is generated and an electrical signal with a great noise masking amount $\Gamma$ is transmitted in the form of the radio wave RW. That is, the frequencies of each functional block and each signal line are optional.

For example, in the above-described embodiments, the signal line (e.g., the signal line LO1A of FIG. 1) for transmitting the optical signal in FIG. 1 and FIGS. 3 to 8 includes the optical signal line of the optical communication cable, but the present invention is not limited to above. That is, it is enough that a signal line for transmitting an optical signal is a path for propagating (transmitting) the optical signal. For example, space propagation for propagating an optical signal in atmosphere or vacuum can be employed as a signal line.

For example, in the above-described embodiments, the optical signal is converted using the optical signal amplification section 12 of FIG. 1 or the light combine section 122 of FIG. 4, but the present invention is not limited to above. That is, various conversion types can be employed as the type of optical signal conversion. Examples of conversion may include optical signal amplification, optical signal branching, optical signal switching (path switching), optical signal transmission path extension, and optical signal combine.

In summary, it is enough that the signal processing apparatus to which the present invention is applied has the following configuration, and various embodiments can be employed. That is, it is enough that the signal processing system (e.g., the signal transmission system 1 of FIG. 1) to which the present invention is applied is a signal processing system including a light generation unit (e.g., the optical signal generation section 11 of FIG. 1) that generates, as an optical signal, multivalued information (multivalued information generated based on a Y-00 optical communication quantum cryptography protocol) in a multivalued state based on predetermined data (e.g., the predetermined data targeted for transmission), an optical-electrical conversion unit (e.g., the O/E conversion section 13 of FIG. 1) that converts the optical signal into an electrical signal (e.g., the second electrical signal), and a radio wave transmission unit (e.g., the radio wave transmission section 14 of FIG. 1) that transmits, as a radio wave (e.g., the radio wave RW of FIG. 1), the multivalued information converted into the electrical signal.

Such a signal processing system is employed to convert the multivalued information based on the predetermined data into the form of the optical signal. In the case of converting an optical signal into the form of an electrical signal, the third party cannot accurately construct data from the electrical signal with noise. The signal processing system transmits a radio wave based on the electrical signal from which the third party cannot accurately construct the data. Thus, from the radio wave transmitted from such a signal processing system, the third party cannot accurately construct the data. That is, predetermined data in the form of the radio wave is encrypted. Moreover, such a signal processing system can prevent even the third party having intercepted the optical signal and converted the optical signal into the electrical signal from accurately constructing the data from the electrical signal. That is, predetermined data in the form of the optical signal is encrypted.

The light generation unit can include a multivalued information generation unit (e.g., the Y-00 cipher output section 111 of FIG. 1) that generates a first electrical signal of the multivalued information, and an electrical-optical conversion unit (e.g., the E/O conversion section 112 of FIG. 1) that converts the first electrical signal of the multivalued information into an optical signal, and the optical-electrical conversion unit can convert the optical signal into a second electrical signal different from the first electrical signal.

Such a signal processing system is employed so that the multivalued information based on the predetermined data can be generated in the form of the electrical signal. Further, the multivalued information based on the predetermined data is converted into the form of the optical signal from the form of the electrical signal.

An optical conversion unit (e.g., the optical signal amplification section 12 of FIG. 1 or the light combine section 122 of FIG. 4) that converts (e.g., amplify, branch, switch, extend, or combine) the optical signal can be further provided, and the optical-electrical conversion unit converts the optical signal converted by the optical conversion unit.

Noise in the optical signal increases due to various types of conversion (amplification or combine). In a case where the optical signal with the increased noise is converted into an electrical signal, the difficulty in accurate construction of data from the electrical signal increases, and telesecurity in a physical layer can be improved.

Further, the optical conversion unit can convert the optical signal into an optical signal including a component with a frequency different from that of the optical signal, and the optical-electrical conversion unit can convert the optical signal converted by the optical conversion unit into an electrical signal including no high-frequency component as compared to the optical signal.

Such a signal processing system is employed to convert the optical signal into the optical signal including the different component and convert the optical signal including the different frequency component into the second electrical signal. In this manner, an electrical signal including a frequency component as a beat component is generated, for example. The beat component is basically a lower-frequency component as compared to an original frequency component. Generally, such a signal processing system can improve the telesecurity in the physical layer as the frequency of the optical signal increases, i.e., such a signal processing system can improve the telesecurity in the physical layer by the high-frequency optical signal and can transmit the lower-frequency radio wave as compared to the frequency of the optical signal.

A second electrical signal conversion unit (e.g., the local oscillation section 153 or the mixer section 154 of FIG. 7) that converts the second electrical signal into an electrical signal with a frequency different from that of the second electrical signal is further provided, and the radio wave transmission unit transmits, as a radio wave, the second electrical signal converted by the second electrical signal conversion unit.

Such a signal processing system can convert the frequency of the second electrical signal converted from the optical signal into the frequency to be transmitted as the radio wave. That is, the signal processing system generates noise at the frequency of the optical signal so that the telesecurity in the physical layer can be improved by the optical signal and the signal can be transmitted as the radio wave.

EXPLANATION OF REFERENCE NUMERALS

1 Signal Transmission System, 11 Optical Signal Generation Section, 111 Y-00 Cipher Output Section, 112 E/O Conversion Section, 12 Optical Signal Amplification Section, 13 O/E Conversion Section, 14 Radio Wave Transmission Section, 2 Signal Reception System, 21 Radio Wave Reception Section, 22 E/O Conversion Section, 23 Optical Signal Amplification Section, 24 O/E Conversion Section, 25 Y-00 Cipher Input Section, RW Radio Wave, 121 Laser Generation Section, 122 Light Combine Section, 131 Local Oscillation Section, 132 Mixer Section, 133 Laser Generation Section, 134 Light Combine Section, 141 Local Oscillation Section, 142 Mixer Section, 151 Local Oscillation Section, 152 Mixer Section, 153 Local Oscillation Section, 154 Mixer Section, 161 Local Oscillation Section, 162 Mixer Section

The invention claimed is:

1. A signal processing system comprising:
a light generation unit that generates, as an optical signal, multivalued information in a multivalued state based on predetermined data;
an optical-electrical conversion unit that converts the optical signal into an encrypted electrical signal; and
a radio wave transmission unit that transmits, as a radio wave, the multivalued information converted into the encrypted electrical signal.

2. The signal processing system according to claim 1, wherein
the light generation unit includes:
a multivalued information generation unit that generates a first electrical signal of the multivalued information; and
an electrical-optical conversion unit that converts the first electrical signal of the multivalued information into the optical signal,
wherein the optical-electrical conversion unit converts the optical signal into the encrypted electrical signal different from the first electrical signal.

3. The signal processing system according to claim 2, further comprising:
a first electrical signal conversion unit that converts the first electrical signal into an electrical signal including a higher-frequency component as compared to the first electrical signal,
wherein the electrical-optical conversion unit converts the first electrical signal converted by the first electrical signal conversion unit into the optical signal.

4. The signal processing system according to claim 2, further comprising:
an optical conversion unit that converts the optical signal,
wherein the optical-electrical conversion unit converts the optical signal converted by the optical conversion unit.

5. The signal processing system according to claim 4, wherein
the optical conversion unit converts the optical signal into an optical signal including a component with a frequency different from that of the optical signal, and
the optical-electrical conversion unit converts the optical signal converted by the optical conversion unit into an electrical signal including no high-frequency component as compared to the optical signal.

6. The signal processing system according to claim 2, further comprising:
a second electrical signal conversion unit that converts the encrypted electrical signal into an electrical signal with a frequency different from that of the encrypted electrical signal,
wherein the radio wave transmission unit transmits, as a radio wave, the encrypted electrical signal converted by the second electrical signal conversion unit.

7. A signal processing system comprising:
a light generation unit that generates, as an optical signal, multivalued information in a multivalued state based on predetermined data, wherein the light generation unit includes:
- a multivalued information generation unit that generates a first electrical signal of the multivalued information; and
- an electrical-optical conversion unit that converts the first electrical signal of the multivalued information into the optical signal;

an optical-electrical conversion unit that converts the optical signal into a second electrical signal different from the first electrical signal; and a radio wave transmission unit that transmits, as a radio wave, the multivalued information converted into the second electrical signal.

8. The signal processing system according to claim 7, further comprising:
a first electrical signal conversion unit that converts the first electrical signal into an electrical signal including a higher-frequency component as compared to the first electrical signal,
wherein the electrical-optical conversion unit converts the first electrical signal converted by the first electrical signal conversion unit into the optical signal.

9. The signal processing system according to claim 7, further comprising:
an optical conversion unit that converts the optical signal,
wherein the optical-electrical conversion unit converts the optical signal converted by the optical conversion unit.

10. The signal processing system according to claim 9, wherein
the optical conversion unit converts the optical signal into an optical signal including a component with a frequency different from that of the optical signal, and
the optical-electrical conversion unit converts the optical signal converted by the optical conversion unit into an electrical signal including no high-frequency component as compared to the optical signal.

11. The signal processing system according to claim 7, further comprising:
a second electrical signal conversion unit that converts the second electrical signal into an electrical signal with a frequency different from that of the second electrical signal,
wherein the radio wave transmission unit transmits, as a radio wave, the second electrical signal converted by the second electrical signal conversion unit.

12. A signal transmission system comprising:
a light generation unit that generates an optical signal including multivalued information in a multivalued state based on predetermined data;
an optical-electrical conversion unit that converts the optical signal into an encrypted electrical signal including the multivalued information; and
a radio wave transmission unit that transmits the encrypted electrical signal including the multivalued information as a radio wave from the signal transmission system, wherein
the signal transmission system is configured to transmit the radio wave including the multivalued information to a signal reception system.

13. The signal transmission system according to claim 12, wherein
the light generation unit includes:
- a multivalued information generation unit that generates a first electrical signal of the multivalued information; and
- an electrical-optical conversion unit that converts the first electrical signal of the multivalued information into the optical signal, wherein the optical-electrical conversion unit converts the optical signal into the encrypted electrical signal different from the first electrical signal.

14. The signal transmission system according to claim 13, further comprising:
a first electrical signal conversion unit that converts the first electrical signal into an electrical signal including a higher-frequency component as compared to the first electrical signal,
wherein the electrical-optical conversion unit converts the first electrical signal converted by the first electrical signal conversion unit into the optical signal.

15. The signal transmission system according to claim 13, further comprising:
an optical conversion unit that converts the optical signal,
wherein the optical-electrical conversion unit converts the optical signal converted by the optical conversion unit.

16. The signal transmission system according to claim 15, wherein
the optical conversion unit converts the optical signal into an optical signal including a component with a frequency different from that of the optical signal, and
the optical-electrical conversion unit converts the optical signal converted by the optical conversion unit into an electrical signal including no high-frequency component as compared to the optical signal.

17. The signal transmission system according to claim 13, further comprising:
a second electrical signal conversion unit that converts the encrypted electrical signal into an electrical signal with a frequency different from that of the encrypted electrical signal,
wherein the radio wave transmission unit transmits, as a radio wave, the encrypted electrical signal converted by the second electrical signal conversion unit.

* * * * *